(12) United States Patent
Matsuda et al.

(10) Patent No.: US 9,692,543 B2
(45) Date of Patent: Jun. 27, 2017

(54) OPTICAL TRANSMISSION SYSTEM

(71) Applicant: NIPPON TELEGRAPH AND TELEPHONE CORPORATION, Tokyo (JP)

(72) Inventors: Toshiya Matsuda, Tokyo-to (JP); Fukutaro Hamaoka, Tokyo-to (JP); Akira Naka, Tokyo-to (JP); Kohei Saito, Tokyo-to (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 0 days.

(21) Appl. No.: 15/027,610

(22) PCT Filed: Sep. 11, 2014

(86) PCT No.: PCT/JP2014/004696
§ 371 (c)(1),
(2) Date: Apr. 6, 2016

(87) PCT Pub. No.: WO2015/052874
PCT Pub. Date: Apr. 16, 2015

(65) Prior Publication Data
US 2016/0241352 A1 Aug. 18, 2016

(30) Foreign Application Priority Data

Oct. 9, 2013 (JP) .................................. 2013-211931
Jul. 25, 2014 (JP) .................................. 2014-151488

(51) Int. Cl.
*H04B 10/00* (2013.01)
*H04B 10/12* (2006.01)
(Continued)

(52) U.S. Cl.
CPC ............ *H04J 14/02* (2013.01); *H04B 10/532* (2013.01); *H04B 10/5561* (2013.01);
(Continued)

(58) Field of Classification Search
CPC . H04J 14/02; H04B 10/6151; H04B 10/6165; H04B 10/6161; H04B 10/6164;
(Continued)

(56) References Cited

U.S. PATENT DOCUMENTS 8,068,742 B2 * 11/2011 Cole ...................... H04B 10/40
398/139
8,184,992 B2 * 5/2012 Kikuchi ................. H04B 10/61
398/202
(Continued)

FOREIGN PATENT DOCUMENTS

EP 2475114 A1 7/2012
JP 2012-119759 A 6/2012
(Continued)

OTHER PUBLICATIONS

Mingbo Niu et al., MIMO Architecture for Coherent Optical Wireless Communication: System Design and Performance, May 5, 2013 Vo. 5, Opt. Commun. Netw.*
(Continued)

*Primary Examiner* — Ken N Vanderpuye
*Assistant Examiner* — Abbas H Alagheband
(74) *Attorney, Agent, or Firm* — Harness, Dickey & Pierce P.L.C.

(57) ABSTRACT

A receiver is configured to have two coherent receivers using two pieces of local oscillator of optical frequencies f11 and f12 close to optical frequency f1 of signal light, the two pieces of local oscillator being controlled to have a predetermined optical frequency spacing ΔF, and a digital signal processor demodulating transmission data signal sequences based on outputs from the coherent receivers. When the frequency difference Δf1 of one of the two pieces of local oscillator from a virtual reference frequency f1' close to the optical frequency f1 of the signal light is set, the digital
(Continued)

signal processor obtains the frequency difference $\Delta f2$ of the other of the two pieces of local oscillator by calculating $\Delta f1-\Delta F$, inputs electric signals output from the two coherent receivers, and compensates the phase rotation caused in the electric signals by frequency differences $\Delta f1$ and $\Delta f2$.

8 Claims, 14 Drawing Sheets

(51) Int. Cl.
*H04B 14/06* (2006.01)
*H04J 14/02* (2006.01)
*H04B 10/61* (2013.01)
*H04B 10/556* (2013.01)
*H04B 10/532* (2013.01)

(52) U.S. Cl.
CPC ..... *H04B 10/6151* (2013.01); *H04B 10/6161* (2013.01); *H04B 10/6164* (2013.01); *H04B 10/6165* (2013.01)

(58) Field of Classification Search
CPC ... H04B 10/5561; H04B 10/532; H04B 10/69
USPC ..................................... 398/79, 152, 184, 65
See application file for complete search history.

(56) References Cited

U.S. PATENT DOCUMENTS

| | | | | |
|---|---|---|---|---|
| 8,355,637 | B2* | 1/2013 | Sano | H04B 10/69 398/202 |
| 8,406,635 | B2* | 3/2013 | Nakashima | H04B 10/60 375/316 |
| 8,406,638 | B2* | 3/2013 | Hoshida | H04B 10/60 398/202 |
| 8,886,057 | B2* | 11/2014 | Hironishi | H04B 10/6161 398/147 |
| 2004/0114939 | A1* | 6/2004 | Taylor | H04B 10/61 398/152 |
| 2006/0245766 | A1* | 11/2006 | Taylor | H04B 10/60 398/208 |
| 2008/0145063 | A1* | 6/2008 | Li | H04B 10/40 398/140 |
| 2011/0129230 | A1* | 6/2011 | Zanoni | H04B 10/5055 398/140 |
| 2012/0213532 | A1* | 8/2012 | Hironishi | H04B 10/6165 398/208 |
| 2013/0071119 | A1* | 3/2013 | Liu | H04B 10/516 398/65 |
| 2013/0209089 | A1* | 8/2013 | Harley | H04B 10/5561 398/25 |
| 2014/0270803 | A1* | 9/2014 | Olsson | H04B 10/532 398/152 |

FOREIGN PATENT DOCUMENTS

JP 2014-053679 A 3/2014
WO WO-2014-038121 A1 3/2014

OTHER PUBLICATIONS

Akhil R. Shah et al., "Coherent Optical MIMO (COMIMO)", Journal of Lightwave Technology vol. 23, No. 8, Aug. 2005.*
Joe Berthold et al., "100G Ultra Long Haul DWDM Framework Document," OFC/NFOEC 2009, Optical Internetworking Forum, Mar. 26, 2009.
"The multi-antenna wireless transmission technology," NTT DoCoMo, vol. 13, No. 3, 2005, pp. 68-75.
Yojiro Mod et al., "Novel configuration of finite-impulse-response filters tolerant to carrier-phase fluctuations in digital coherent optical receivers for higher-order quadrature amplitude modulation signals," Optics Express, vol. 20, No. 24, Nov. 19, 2012.
Mingbo Niu et al., "MIMO Architecture for Coherent Optical Wireless Communication: System Design and Performance," IEEE/OSA Journal of Optical Communications and Networking, vol. 5, No. 5, May 2013, pp. 411-420.
Akhil R. Shah et al., "Coherent Optical MIMO (COMIMO)," IEEE Journal of Lightwave Technology, vol. 23, No. 8, Aug. 2005, pp. 2410-2419.
International Search Report and Written Opinion of the ISA for PCT/JP2014/004696, ISA/JP, mailed Oct. 7, 2014.
Extended European Search Report for parallel application EP 14852459, EP, Munich, issued Mar. 8, 2017.

* cited by examiner

FIG. 1
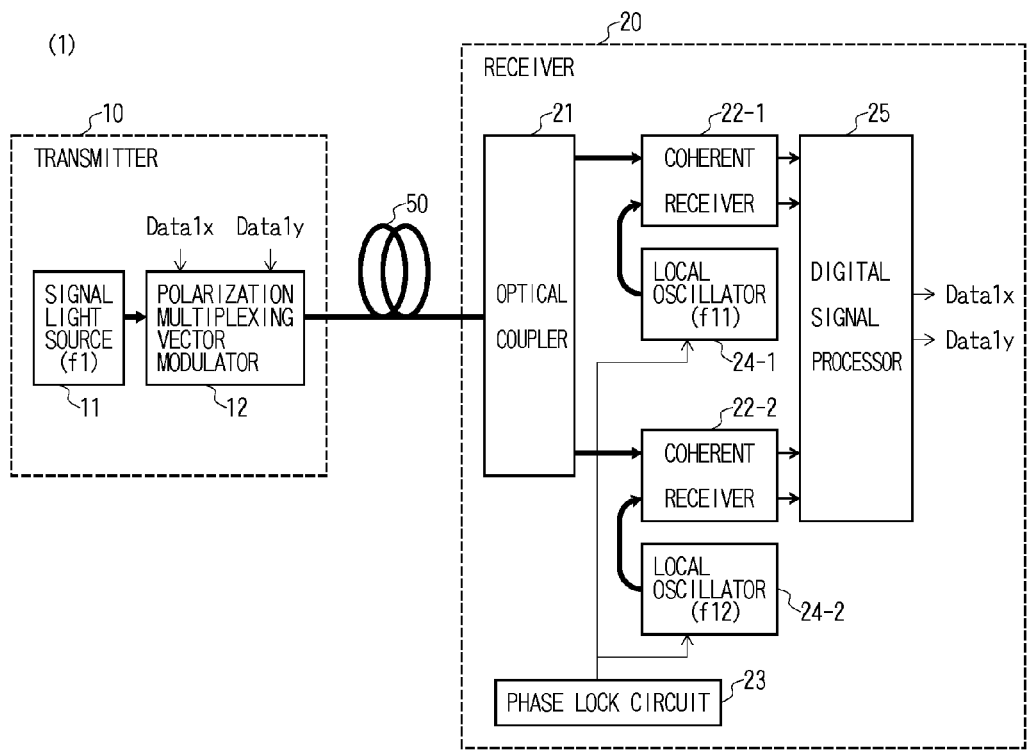
(2) COHERENT RECEIVER INPUT
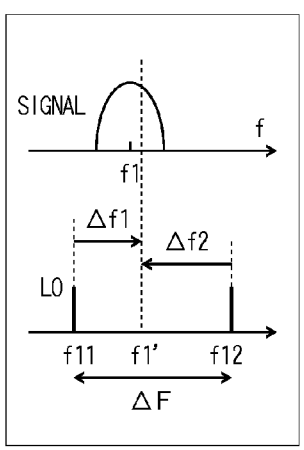
(3) PHASE ROTATION COMPENSATION CIRCUIT INPUT
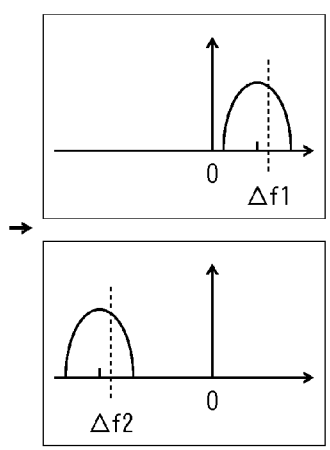
(4) PHASE ROTATION COMPENSATION CIRCUIT OUTPUT
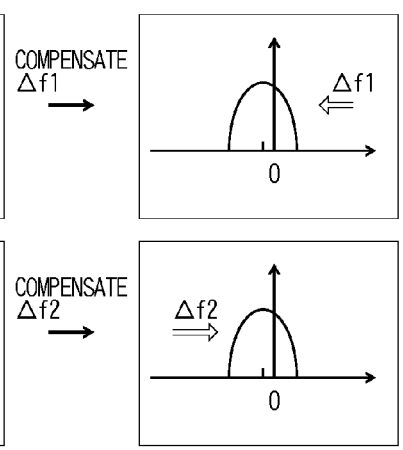

FIG. 6
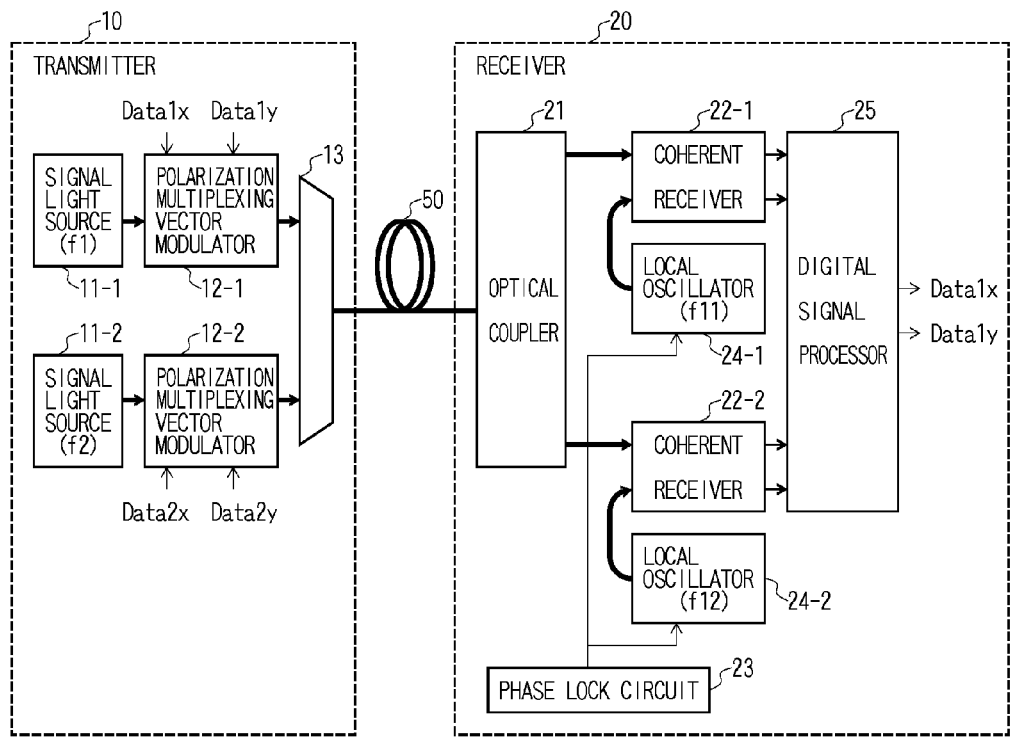
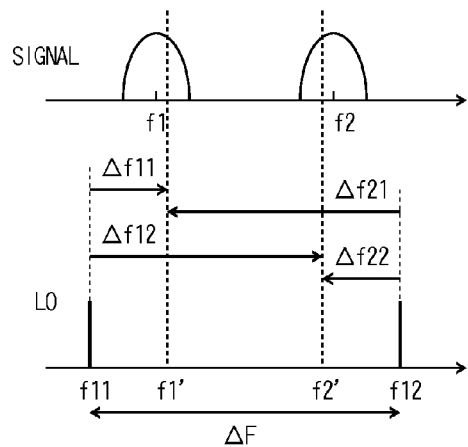

FIG. 9
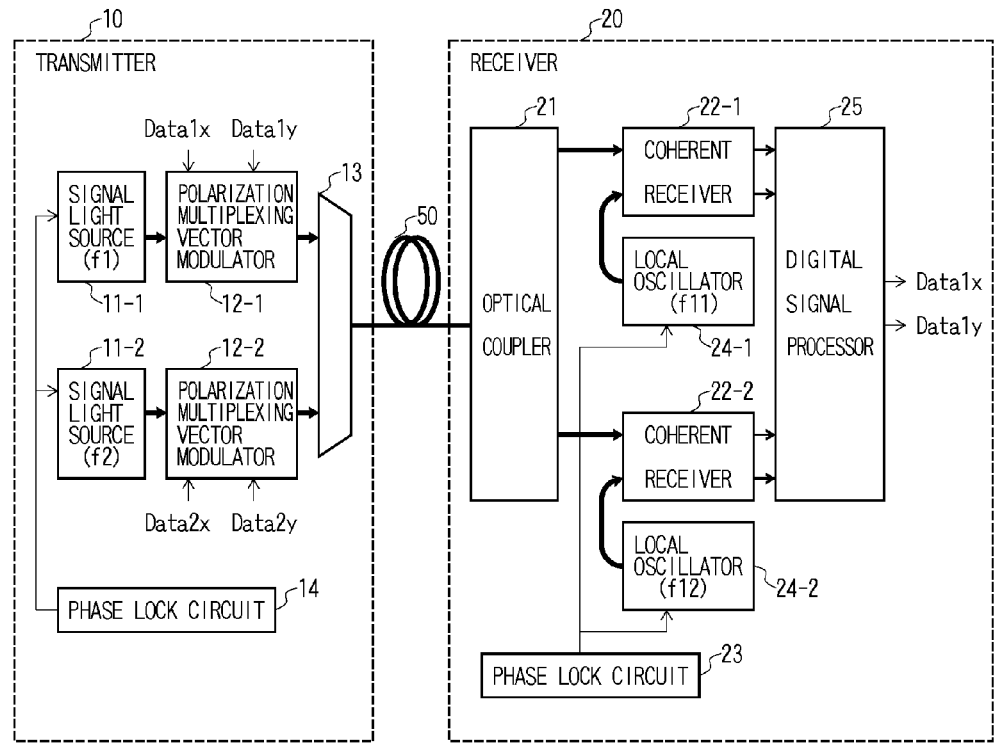
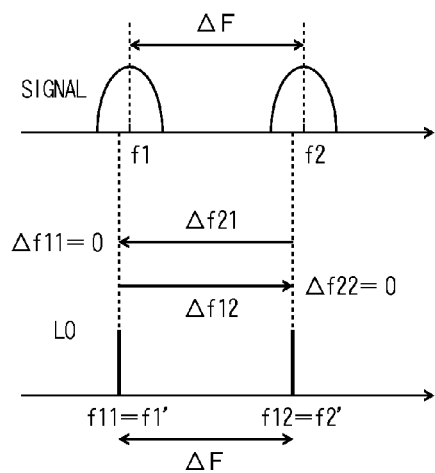

FIG. 12
(1) DEMODULATION SIGNAL IN THE CONVENTIONAL STRUCTURE (WITHOUT CROSSTALK) BER=3.4×10$^{-4}$
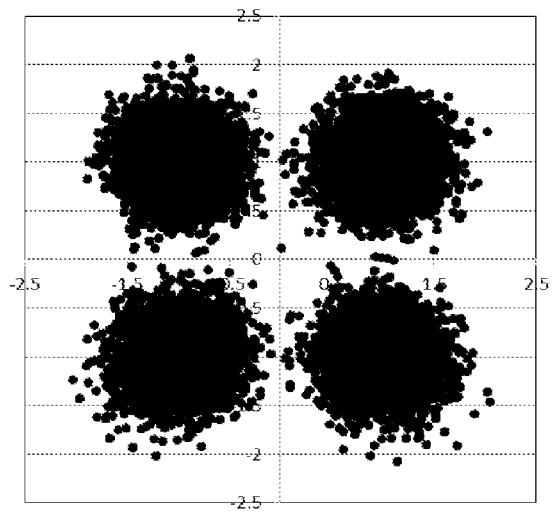
(2) DEMODULATION SIGNAL IN THE INVENTION    BER=3.5×10$^{-5}$
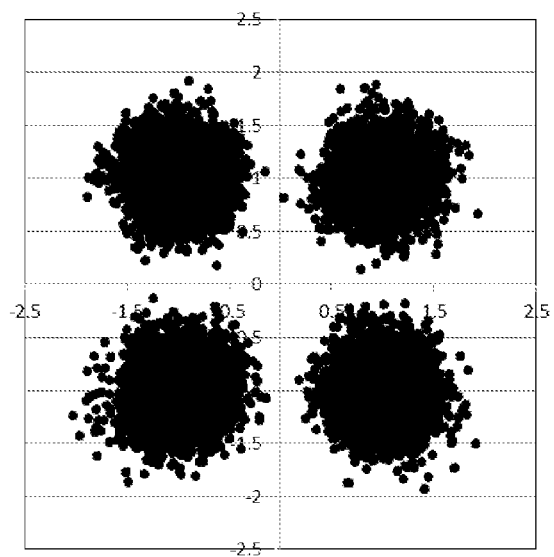

F I G. 1 3
(1) DEMODULATION SIGNAL IN THE CONVENTIONAL STRUCTURE (WITH CROSSTALK)
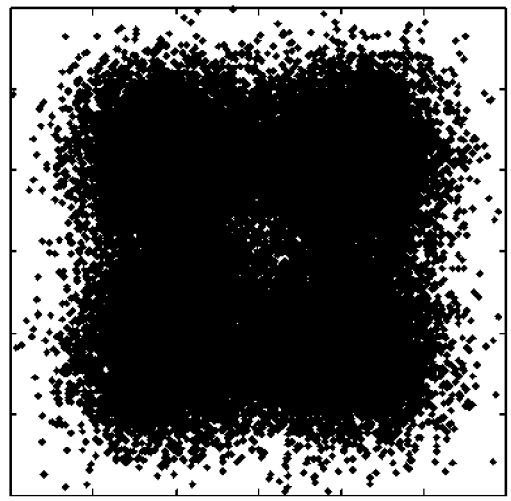
(2) DEMODULATION SIGNAL IN THE INVENTION
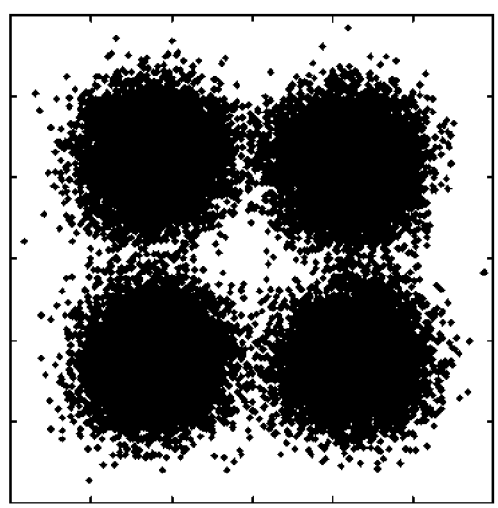

OPTICAL TRANSMISSION SYSTEM

CROSS REFERENCE TO RELATED APPLICATION

This application is a U.S. National Stage application claiming the benefit of prior filed International Application Number PCT/JP2014/004696, filed on Sep. 11, 2014, in which the International Application claims priority from Japanese Patent Application Numbers 2013-211931, filed on Oct. 9, 2013 and 2014-151488, filed on Jul. 25, 2014, the entire contents of which are incorporated herein by reference.

TECHNICAL FIELD

The present invention relates to an optical transmission system that performs MIMO signal processing using a digital coherent technology and a plurality of receivers.

BACKGROUND ART

In ultra high speed transmission systems having a bitrate of a signal per wavelength of 100 Gbit/s or more, digital coherent technology that combines a coherent optical communication technology and a digital signal processing technology has been widely used. The DP-QPSK (Dual Polarization-Quadrature Phase Shift Keying) system described in NPL 1 is a standard system as a modulation/demodulation system in 100 Gbit/s long-distance optical transmission systems. In 100 Gbit/s long-distance optical transmission systems, for example, 4-value phase modulation is used to generate a 32 Gbit/s signal, this signal is doubly multiplexed to generate a coherent optical signal, and the coherent optical signal is further doubly multiplexed using two polarized waves to generate a 128 Gbit/s coherent optical signal. By wavelength-multiplexing DP-QPSK optical signals of different wavelengths, it is possible to achieve an optical transmission system having a transmission capacity of several terabits per second.

The reception side performs coherent detection using local oscillator having the same wavelength as the signal light, digitizes the received signal using an AD converter, and performs digital signal processing using a DSP. This performs the chromatic dispersion compensation and polarization mode dispersion compensation of the transmission line, the demodulation and phase estimation of polarization multiplexed signals, and the like, thereby achieving excellent transmission characteristics.

On the other hand, in the field of radio transmission, NPL 2 proposes, as an approach for further improving reception characteristics, the MIMO diversity technology for improving receiver sensitivities using a plurality of receivers.

PRIOR ART DOCUMENTS

Non-Patent Documents

Non-patent Document 1: OIF, "100G Ultra Long Haul DWDM Framework Document"
Non-patent Document 2: Mamoru Sawahashi, Kenichi Higuchi, Noriyuki Maeda, Hidekazu Taoka, "Multi-antenna Radio Transmission Technology 1, Summary of Multi-antenna Radio Transmission Technology", NTT DoCoMo Technical journal, Vol. 13, No. 3, pp. 68 to 75, 2005
Non-patent Document 3: Yojiro Mori, Chao Zhang, and Kazuro Kikuchi, "Novel Configuration of Finite-impulse-response Filters Tolerant to Carrier-phase Fluctuations in Digital Coherent Optical Receivers for Higher-order Quadrature Amplitude Modulation Signals", Optics Express, vol. 20, no. 24, pp. 26236 to 26251, 2012.

DISCLOSURE

Problems to be Solved

The maximum effect of a MIMO diversity technology can be obtained when the correlation between signals to be synthesized is low. However, when using a plurality of pieces of signal light having passed through different paths or a plurality of pieces of signal light having different wavelengths to obtain signals having low correlation in optical transmission, in a viewpoint of the transmission capacity, the transmission capacity of the entire system becomes low.

A proposition of the invention is to provide an optical transmission system that can improve reception characteristics without reducing the transmission capacity using a structure in which a plurality of coherent receivers are used for one or more pieces of signal light.

Means for Solving the Problems

A first aspect according to the present invention provides an optical transmission system including a transmitter, a receiver, and an optical fiber transmission line, the transmitter and the receiver being connected to each other via the optical fiber transmission line, signal light being transmitted through the optical fiber transmission line, in which the transmitter is configured to generate signal light in which an optical carrier signal of an optical frequency f1 is modulated and multiplexed with orthogonal polarization using two data signal sequences and send out the signal light to the optical fiber transmission line, the receiver is configured to have two coherent receivers that perform coherent detection of the signal light using two pieces of local oscillator of optical frequencies f11 and f12 close to the optical frequency f1 of the signal light, f11<f12 holding, the two pieces of local oscillator being controlled to have a predetermined optical frequency spacing $\Delta F$, and a digital signal processor that performs digital signal processing by inputting electric signals output from each of the coherent receivers and demodulates the two data signal sequences, in which the digital signal processor sets a virtual reference frequency f1' close to the optical frequency f1 of the signal light for the two pieces of local oscillator and a frequency difference $\Delta f1$ of one of the two pieces of local oscillator from the reference frequency f1', obtains a frequency difference $\Delta f2$ of the other of the two pieces of local oscillator by calculating $\Delta f1-\Delta F$, and further includes a plurality of phase rotation compensation circuits that input the electric signals output from the two coherent receivers and compensates phase rotation caused in the electric signals by the frequency differences $\Delta f1$ and $\Delta f2$, a waveform equalization circuit that performs adaptive equalization on outputs from the plurality of phase rotation compensation circuits, and a phase estimation circuit that compensates a residual component of phase rotation caused by a frequency difference between the optical frequency f1 of the signal light and the virtual reference frequency f1' in an output from the waveform equalization circuit.

In the optical transmission system according to the first aspect, the receiver has a frequency difference measurement device that measures an optical frequency spacing between the two pieces of local oscillator as $\Delta F'$ instead of controlling the optical frequency spacing to $\Delta F$, and the digital signal processor sets the frequency difference $\Delta f1$ of the one of the two pieces of local oscillator from the reference frequency $f1'$ and obtains the frequency difference $\Delta f2$ of the other of the two pieces of local oscillator by calculating $\Delta f1 - \Delta F'$ based on the measured optical frequency spacing $\Delta F'$.

A second aspect according to the present invention provides an optical transmission system including a transmitter, a receiver, and an optical fiber transmission line, the transmitter and the receiver being connected to each other via the optical fiber transmission line, signal light being transmitted through the optical fiber transmission line, in which the transmitter is configured to generate signal light in which an optical carrier signal of an optical frequency f1 is modulated and multiplexed with orthogonal polarization using two data signal sequences and send out the signal light to the optical fiber transmission line, the receiver is configured to have p coherent receivers that perform coherent detection of the signal light using first to pth pieces of local oscillator of optical frequencies f11, f12, . . . , f1p close to the optical frequency f1 of the signal light, f11<f12<. . . <f1p holding, p being an integer equal to or more than 3, the first to pth pieces of local oscillator being controlled to have predetermined optical frequency spacings $\Delta F1$ to $\Delta F(p-1)$, and a digital signal processor that performs digital signal processing by inputting electric signals output from each of the coherent receivers, and demodulates the two data signal sequences, in which the digital signal processor sets a virtual reference frequency $f1'$ close to the optical frequency f1 of the signal light for the first to pth pieces of local oscillator and a frequency difference $\Delta f1$ of the first piece of local oscillator from the reference frequency $f1'$, obtains a frequency difference $\Delta f2$ of the second piece of local oscillator by calculating $\Delta f1 - \Delta F1$ and a frequency difference $\Delta fp$ of the pth piece of local oscillator by calculating $\Delta f(p-1) - \Delta F(p-1)$, and further includes a plurality of phase rotation compensation circuits that input the electric signals output from each of the p coherent receivers and compensates phase rotation caused in the electric signals by the frequency differences $\Delta f1$ to $\Delta fp$, a waveform equalization circuit that performs adaptive equalization on outputs from the plurality of phase rotation compensation circuits, and a phase estimation circuit that compensates a residual component of phase rotation caused by a frequency difference between the optical frequency f1 of the signal light and the virtual reference frequency $f1'$ in an output from the waveform equalization circuit.

In the optical transmission system according to the second aspect, the receiver has a frequency difference measurement device that measures optical frequency spacings of the first to pth pieces of local oscillator as $\Delta F1'$ to $\Delta F(p-1)'$ instead of controlling the optical frequency spacings to $\Delta F1$ to $\Delta F(p-1)$, and the digital signal processor sets the frequency difference $\Delta f1$ of the first piece of local oscillator from the reference frequency $f1'$ and obtains the frequency differences $\Delta f2$ to $\Delta fp$ of the others of the p pieces of local oscillator by calculating $\Delta f1 - \Delta F1'$ to $\Delta f(p-1) - \Delta F(p-1)'$ based on the measured optical frequency spacings $\Delta F1'$ to $\Delta F(p-1)'$.

A third aspect according to the present invention provides the optical transmission system including a transmitter, a receiver, and an optical fiber transmission line, the transmitter and the receiver being connected to each other via the optical fiber transmission line, signal light being transmitted through the optical fiber transmission line, in which the transmitter is configured to generate first signal light and second signal light in which optical carrier signals of the optical frequency f1 and an optical frequency f2 are modulated and multiplexed with orthogonal polarization using two data signal sequences, wavelength-multiplex the first signal light and the second signal light, and send out the first signal light and the second signal light to the optical fiber transmission line, the receiver is configured to have two coherent receivers that perform coherent detection of the wavelength-multiplexed and transmitted first signal light and second signal light using two pieces of local oscillator of optical frequencies f11 and f12 close to the optical frequencies f1 and f2 of the first signal light and the second signal light, f11<f12 holding, the two pieces of local oscillator being controlled to have a predetermined optical frequency spacing $\Delta F$, and a digital signal processor that performs digital signal processing by inputting electric signals output from each of the coherent receivers and demodulates the two data signal sequences transmitted by the first signal light and the two data signal sequences transmitted by the second signal light, in which the digital signal processor sets the optical frequencies f1 and f2 of the first signal light and the second signal light and virtual reference frequencies $f1'$ and $f2'$ close to the optical frequencies f1 and f2 for the two pieces of local oscillator and frequency differences $\Delta f11$ and $\Delta f12$ of one of the two pieces of local oscillator from the reference frequencies $f1'$ and $f2'$, obtains frequency differences $\Delta f21$ and $\Delta f22$ of the other of the two pieces of local oscillator by calculating $\Delta f11 - \Delta F$ and $\Delta f12 - \Delta F$, and further includes a plurality of first phase rotation compensation circuits that input the electric signals output from the two coherent receivers, compensate phase rotation caused in the electric signals by the frequency differences $\Delta f11$ and $\Delta f21$, and separate and output a signal component transmitted by the first signal light, a first waveform equalization circuit that performs adaptive equalization on outputs from the plurality of first phase rotation compensation circuits, a first phase estimation circuit that compensates a residual component of phase rotation caused by a frequency difference between the optical frequency f1 of the first signal light and the virtual reference frequency $f1'$ in an output from the first waveform equalization circuit, a plurality of second phase rotation compensation circuits that input the electric signals output from the two coherent receivers, compensate phase rotation caused in the electric signals by the frequency differences $\Delta f12$ and $\Delta f22$, and separate and output a signal component transmitted by the second signal light, a second waveform equalization circuit that performs adaptive equalization on outputs from the plurality of second phase rotation compensation circuits, and a second phase estimation circuit that compensates a residual component of phase rotation caused by a frequency difference between the optical frequency f2 of the signal light and the virtual reference frequency $f2'$ in an output from the second waveform equalization circuit.

In the optical transmission system according to the third aspect, the receiver has a frequency difference measurement device that measures an optical frequency spacing between the two pieces of local oscillator as $\Delta F'$ instead of controlling the optical frequency spacing to $\Delta F$, and the digital signal processor sets the frequency differences $\Delta f11$ and $\Delta f12$ of the one of the two pieces of local oscillator from the reference frequencies $f1'$ and $f2'$ and obtains the frequency differences $\Delta f21$ and $\Delta f22$ of the other of the two pieces of local oscillator by calculating $\Delta f11-\Delta F'$ and $\Delta f12-\Delta F'$ based on the measured optical frequency spacing $\Delta F'$.

A fourth aspect according to the present invention provides the optical transmission system including a transmitter, a receiver, and an optical fiber transmission line, the transmitter and the receiver being connected to each other via the optical fiber transmission line, signal light being transmitted through the optical fiber transmission line, in which, when n is an integer equal to or more than 2, m is an integer equal to or more than 2, k is an integer from 1 to n, and i is an integer from 2 to m, the transmitter is configured to generate n pieces of signal light in which optical carrier signals of optical frequencies f1 to fn are modulated and multiplexed with orthogonal polarization using two data signal sequences, wavelength-multiplex the n pieces of signal light, and send out the n pieces of light to the optical fiber transmission line, the receiver is configured to have m coherent receivers that perform coherent detection of the n pieces of signal light using m pieces of local oscillator of optical frequencies f11 to f1$m$ close to the optical frequencies f1 to fn of the n pieces of signal light, f11<f12<...<f1$m$ holding, the m pieces of local oscillator being controlled to have predetermined optical frequency spacings $\Delta F1$ to $\Delta F(m-1)$, and a digital signal processor performs digital signal processing by inputting electric signals output from the m coherent receivers and demodulates the 2n data signal sequences, in which the digital signal processor sets a virtual reference frequency fk' close to an optical frequency fk of the n pieces of signal light for the m pieces of local oscillator and a frequency difference $\Delta$fk of one of the m pieces of local oscillator from the reference frequency fk', obtains a frequency difference $\Delta$fi of another of the m pieces of local oscillator by calculating $\Delta f(i-1)-\Delta F(i-1)$, and further includes a plurality of phase rotation compensation circuits that input the electric signals output from the m coherent receivers and compensates phase rotation caused in the electric signals by the frequency difference $\Delta$fk, a waveform equalization circuit that performs adaptive equalization on outputs from the plurality of phase rotation compensation circuits, and a phase estimation circuit that compensates a residual component of phase rotation caused by a frequency difference between the optical frequency fk of the n pieces of signal light and the virtual reference frequency fk' in an output from the waveform equalization circuit.

In the optical transmission system according to the fourth aspect, the receiver has a frequency difference measurement device that measures optical frequency spacings of the m pieces of local oscillator as $\Delta F1'$ to $\Delta F(m-1)'$ instead of controlling the optical frequency spacings to $\Delta F1$ to $\Delta F(m-1)$, and the digital signal processor sets the frequency difference $\Delta$fk of the one of the m pieces of local oscillator from the reference frequency fk' obtains the frequency difference $\Delta$fi of another of the m pieces of local oscillator by calculating $\Delta f(i-1)-\Delta F(i-1)$ based on the measured optical frequency spacing $\Delta F1'$ to $\Delta F(m-1)'$.

Effects

The invention adjusts the optical frequency spacing of a plurality of pieces of local oscillator used by a plurality of coherent receivers of a receiver to a specified value, so that stable demodulation can be performed by compensating phase rotation caused by the frequency difference between the signal light and individual pieces of local oscillator even if fluctuations are present between the optical frequency of signal light and the optical frequency of the individual pieces of local oscillator.

In addition, by enabling diversity effects using the structure in which a plurality of coherent receivers are used for one or more pieces of signal light, the reception characteristics can be improved without reducing the transmission capacity.

BRIEF DESCRIPTION OF THE DRAWINGS

FIG. 1 is a diagram illustrating the structure of a first embodiment of the present invention.

FIG. 6 is a diagram illustrating the structure of a fifth embodiment of the invention.

FIG. 9 is a diagram illustrating the structure of an eighth embodiment of the invention.

FIG. 12 illustrates examples of demodulation signals in the conventional structure and the structure according to the invention.

FIG. 13 illustrates examples of demodulation signals in the conventional structure and in the structure according to the invention.

DETAILED DESCRIPTION OF THE EMBODIMENTS

First Embodiment

Figure 2:
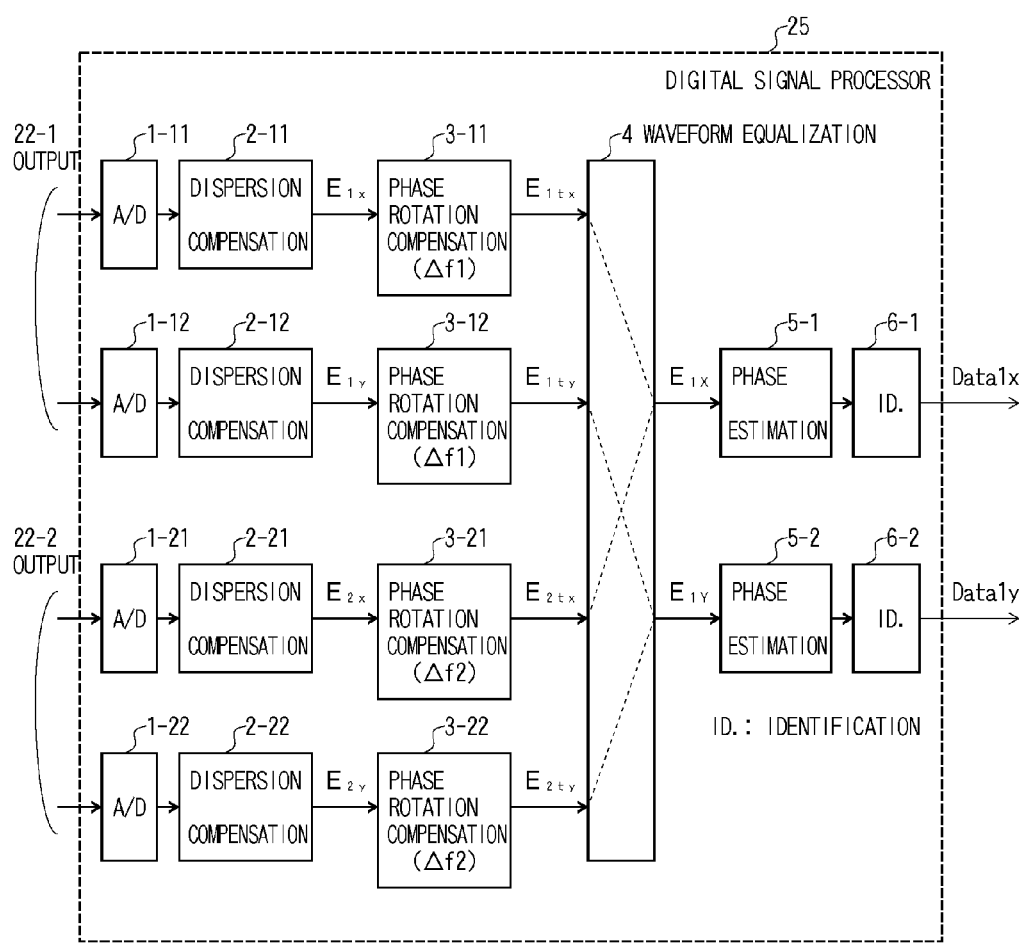
FIG. 2 is a diagram illustrating an example of the structure of a digital signal processor 25 according to the first embodiment.

FIG. 1 illustrates the structure of a first embodiment of an optical transmission system according to the present invention.

In FIG. 1, a transmitter 10 is connected to a receiver 20 via an optical fiber transmission line 50 in the optical transmission system according to the first embodiment. The transmitter 10 includes a signal light source 11 and a polarization multiplexing vector modulator 12. The signal light source 11 outputs the optical carrier signal of an optical frequency f1. The polarization multiplexing vector modulator 12 modulates and multiplexes the optical carrier signal of the optical frequency f1 output from the signal light source 11 with orthogonal polarization using two data signal sequences Data1$x$ and Data1$y$ and outputs the generated signal light to the optical fiber transmission line 50.

The receiver 20 includes an optical coupler 21, coherent receivers 22-1 and 22-2, a phase lock circuit 23, local oscillator light sources 24-1 and 24-2, and a digital signal processor 25. The optical coupler 21 branches the signal light received via the optical fiber transmission line 50 into two pieces and inputs them to the coherent receivers 22-1 and 22-2. The local oscillator light sources 24-1 and 24-2 input, to the coherent receivers 22-1 and 22-2, the local oscillator light of the optical frequencies f11 and f12 close to the optical frequency f1 of the signal light, the local oscillator light being controlled by the phase lock circuit 23 to have the predetermined optical frequency spacing ΔF. Here, f11<f12 and ΔF=f12−f11 hold. The coherent receivers 22-1 and 22-2 perform coherent detection of the signal light of the optical frequency f1 branched by the optical coupler 21 using the two pieces of local oscillator light of the optical frequencies f11 and f12 and output them to the digital signal processor 25. The digital signal processor 25 performs the digital signal processing of electric signals input from the coherent receivers 22-1 and 22-2 and demodulates the data signal sequences Data1x and Data1y.

Although the optical frequencies f11 and f12 of the local oscillator light sources 24-1 and 24-2 are set to values close to the optical frequency f1 of the signal light in the first embodiment, it is actually difficult to make the optical frequencies f11 and f12 stably coincide with the optical frequency f1 of the signal light due to frequency fluctuations of the light sources or the like. However, the optical frequency spacing ΔF between the two pieces of local oscillator can be adjusted to a specified value by the phase lock circuit 23 and the two pieces of local oscillator fluctuate in the same frequency direction. When the frequency difference Δf1 of one of the two pieces of local oscillator is set with respect to the virtual reference frequency f1' substantially equal to the optical frequency f1 of the signal light as illustrated in FIG. 1(2) by this adjustment, the frequency difference Δf2 from the other of the two pieces of local oscillator is obtained by the following expression.

$$\Delta f2 = \Delta f1 - \Delta F$$

That is, when the phase rotation amount Δf1 of one of the two pieces of local oscillator is determined based on the virtual reference frequency f1' close to the optical frequency f1 of the signal light, the phase rotation amount Δf2 of the other of the two pieces of local oscillator is obtained. In the phase rotation compensation circuit of the digital signal processor 25, as illustrated in FIGS. 1(3) and 1(4), by compensating the phase rotation amounts Δf1 and Δf2 included in electric signals input from the coherent receivers 22-1 and 22-2, the data signal sequence can be demodulated without being affected by frequency fluctuations of individual pieces of local oscillator. The phase rotation compensation may be made in the frequency domain.

FIG. 2 illustrates an example of the structure of the digital signal processor 25 according to the first embodiment.

In FIG. 2, two complex signals equivalent to the orthogonal polarization components output from the coherent receivers 22-1 and 22-2 are converted by AD converters 1-11, 1-12, 1-21, and 1-22 into digital signals using the sampling period T and then input to dispersion compensation circuits 2-11, 2-12, 2-21, and 2-22. The dispersion compensation circuits perform common dispersion compensation, which is equivalent to a total wavelength dispersion amount in the optical fiber transmission line 50, on the input complex signals and outputs complex signals $E_{1x}$, $E_{1y}$, $E_{2x}$, and $E_{2y}$.

Phase rotation compensation circuit 3-11 and 3-12 receive the complex signals $E_{1x}$ and $E_{1y}$ and output complex signals $E_{1tx}$ and $E_{1ty}$ obtained by compensating the phase rotation amount Δf1 caused by the frequency difference between the signal light of the optical frequency f1 and the local oscillator of the optical frequency f11. Phase rotation compensation circuit 3-21 and 3-22 receive the complex signals $E_{2x}$ and $E_{2y}$ and output complex signals $E_{2tx}$ and $E_{2ty}$ obtained by compensating the phase rotation amount Δf2 caused by the frequency difference between the signal light of the optical frequency f1 and the local oscillator of the optical frequency f12.

A waveform equalization circuit 4 receives the complex signals $E_{1tx}$, $E_{1ty}$, $E_{2tx}$, and $E_{2ty}$ output from the phase rotation compensation circuits 3-11, 3-12, 3-21, and 3-22, performs the adaptive signal processing of an FIR filter using maximum likelihood estimation for each polarization component, and outputs complex signals $E_{1X}$ and $E_{1Y}$. The complex signals $E_{1X}$ and $E_{1Y}$ include phase rotation residual components caused by the phase difference and the frequency difference between the optical frequency f1 of the signal light and the virtual reference frequency f1' of the individual pieces of local oscillator.

Phase estimation circuits 5-1 and 5-2 output, to identification circuits 6-1 and 6-2, the compensated complex signals obtained by compensating the phase rotation residual components of the complex signals $E_{1X}$ and $E_{1Y}$ input from the waveform equalization circuit 4. The identification circuits 6-1 and 6-2 demodulate the data signal sequences Data1x and Data1y from the input complex signals and output them.

Here, the compensation principle of the phase rotation components of complex signals output by the coherent receivers 22-1 and 22-2 will be described.

The complex electric fields of the polarization components of the signal light generated by modulation and multiplexing with orthogonal polarization by the transmitter 10 are represented as $E_{1,ix}$ and $E_{1,iy}$. The complex electric fields $E_{1,ox}$ and $E_{1,oy}$ of the polarization components of the signal light having transmitted through the optical fiber transmission line 50 are indicated by expression (1) using the transfer function determinant $T_1$ of the optical fiber transmission line 50.

[expression 1]

$$\left\{ \begin{bmatrix} E_{1,ox} \\ E_{1,oy} \end{bmatrix} = T_1 \begin{bmatrix} E_{1,ix} \\ E_{1,iy} \end{bmatrix} \right. \tag{1}$$

The signal light that has transmitted through the optical fiber transmission line 50 and indicated by expression (1) is subjected to coherent detection by the coherent receivers 22-1 and 22-2 and output as the complex signals $E_{1x}$, $E_{1y}$, $E_{2x}$, and $E_{2y}$ indicated by expression (2). FIGS. 1(2) and 1(3) illustrate this image.

[expression 2]

$$\left\{ \begin{aligned} \begin{bmatrix} E_{1x} \\ E_{1y} \end{bmatrix} &= R_1 e^{(j2\pi\Delta f1 t)} \Phi_1 \Phi_0(t) T_1 \begin{bmatrix} E_{1,ix} \\ E_{1,iy} \end{bmatrix}, \\ \begin{bmatrix} E_{2x} \\ E_{2y} \end{bmatrix} &= R_2 e^{(j2\pi\Delta f2 t)} \Phi_2 \Phi_0(t) T_1 \begin{bmatrix} E_{1,ix} \\ E_{1,iy} \end{bmatrix} \end{aligned} \right. \tag{2}$$

$R_1$ and $R_2$ in expression (2) represent matrixes indicating the frequency characteristics of the coherent receivers caused by the phase rotation amounts Δf1 and Δf2 of the individual pieces of local oscillator. The terms $\exp(j2\pi\Delta f1 t)$ and $\exp(j2\pi\Delta f2 t)$ represent the phase rotation terms that depend on the phase rotation amounts Δf1 and Δf2 of the individual pieces of local oscillator. The term $\Phi_0(t)$ represents a matrix indicating the phase rotation caused by the frequency difference f1−f1' between the optical frequency f1 of the signal light and the virtual reference frequency f1' of the individual pieces of local oscillator. The terms $\Phi_1$ and $\Phi_2$ represent matrixes indicating the phase rotation caused by the phase difference between the signal light and the individual pieces of local oscillator. The term t represents time.

In the phase rotation compensation circuits 3-11, 3-12, 3-21, and 3-22, the complex signals $E_{1tx}$, $E_{1ty}$, $E_{2tx}$, and $E_{2ty}$, obtained by compensating the phase rotation amounts Δf1 and Δf2 caused by the frequency difference between the signal light and the individual pieces of local oscillator are represented as expression (3).

[expression 3]

$$\begin{cases} \begin{bmatrix} E_{1tx} \\ E_{1ty} \end{bmatrix} = e^{(-j2\pi\Delta f1 t)} \begin{bmatrix} E_{1x} \\ E_{1y} \end{bmatrix} = R_1 \Phi_1 \Phi_0(t) T_1 \begin{bmatrix} E_{1,ix} \\ E_{1,iy} \end{bmatrix}, \\ \begin{bmatrix} E_{2tx} \\ E_{2ty} \end{bmatrix} = e^{(-j2\pi\Delta f2 t)} \begin{bmatrix} E_{2x} \\ E_{2y} \end{bmatrix} = R_2 \Phi_2 \Phi_0(t) T_1 \begin{bmatrix} E_{1,ix} \\ E_{1,iy} \end{bmatrix} \end{cases} \quad (3)$$

Since the optical frequency f1 of the signal light is substantially equal to the virtual reference frequency f1' of the individual pieces of local oscillator and the optical frequency spacing ΔF between the individual pieces of local oscillator is constant in expression (3), $R_1$ and $R_2$ are substantially constant matrixes. In addition, the phases between the individual pieces of local oscillator are synchronized with each other, $\Phi_1$ and $\Phi_2$ can be assumed to be constant matrixes. Accordingly, the phase rotation compensation circuits 3-11, 3-12, 3-21, and 3-22 can approximately calculate $R_1^{-1}$, $R_2^{-1}$, $\Phi_1^{-1}$, $\Phi_2^{-1}$, and $T_1^{-1}$ using an adaptive equalization algorithm such as CMA or LMS generally used in the digital coherent system and can compensate the phase rotation amounts Δf1 and Δf2 of the individual pieces of local oscillator. An adaptive equalization algorithm such as CMA or LMS is described in NPL 3. FIG. 1(4) illustrates this image.

On the other hand, the frequency difference (that is, $\Phi_0(t)$ generated by fluctuations) between the optical frequency f1 of the signal light and the virtual reference frequency f1' of the individual pieces of local oscillator is not compensated and left, but relative phase fluctuations are 0 since it is common in expression (3). Accordingly, $\Phi_0(t)$ can be compensated by the phase estimation circuits 5-1 and 5-2 at a subsequent stage as in a general digital coherent system. In addition, transmission data $E_{1,ix}$ and $E_{1,iy}$ can be calculated at high precision due to diversity effects obtained by using two different expressions for transmission signals $E_{1,ix}$ and $E_{1,iy}$.

FIG. 12 illustrates examples of demodulation signals in the conventional structure and the structure according to the first embodiment of the invention. In this drawing, an example of calculation when using two reception systems having an optical frequency spacing ΔF between the individual pieces of local oscillator of 12 GHz with respect to a 64 Gbit/s single polarization QPSK signal in shown. The OSNR during reception was adjusted to 14 dB. The BER (bit error rate) during use of the conventional reception system was $3.4 \times 10^{-4}$ and the BER during use of the invention was $3.5 \times 10^{-5}$, so the BER was improved by 10 times.

Second Embodiment

Figure 3:
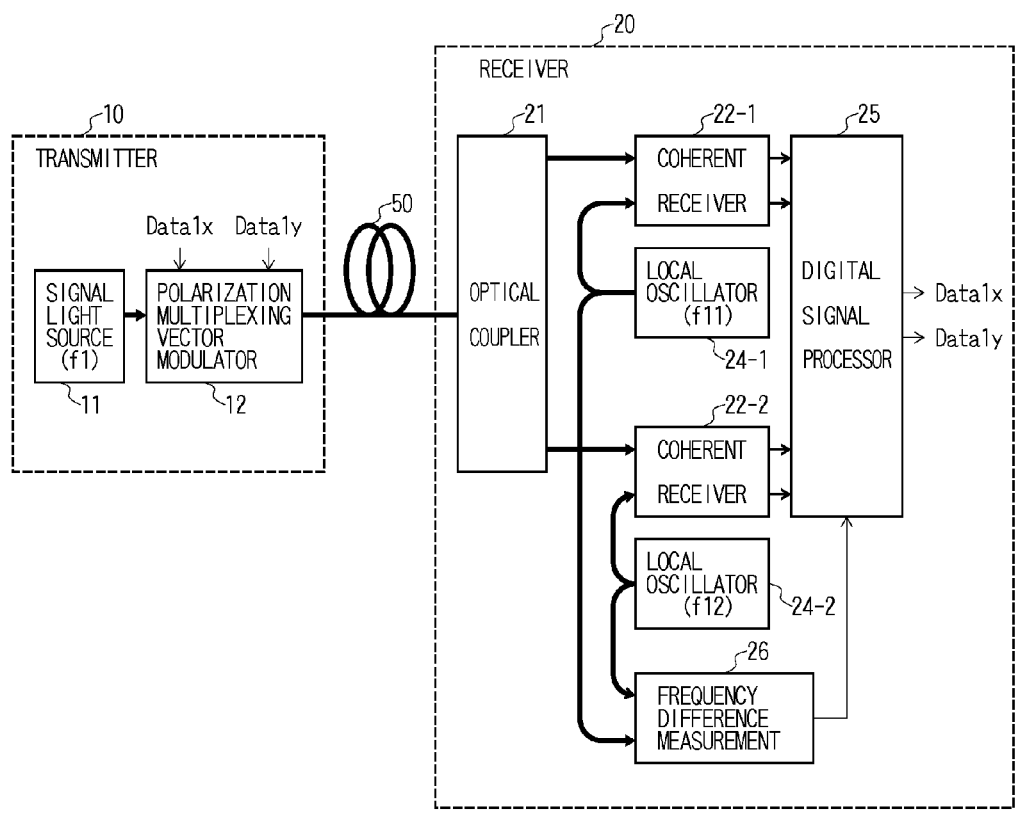
FIG. 3 is a diagram illustrating the structure of a second embodiment of the invention.

FIG. 3 illustrates the structure of a second embodiment of the invention.

The receiver 20 according to the first embodiment is controlled so that the optical frequency spacing ΔF is set to a specified value, which is a constant value, by synchronizing the phases of the individual pieces of local oscillator with each other and the phase rotation amounts Δf1 and Δf2 obtained based on the relationship with ΔF by the digital signal processor 25 are compensated. The receiver 20 according to the second embodiment is configured to measure the optical frequency spacing ΔF of the individual pieces of local oscillator and input it to the digital signal processor 25 to process it.

In FIG. 3, a frequency difference measurement device 26 measures the optical frequency spacing ΔF between the individual pieces of local oscillator of the local oscillator light sources 24-1 and 24-2 and provides the optical frequency spacing ΔF for the digital signal processor 25. For example, the optical frequency spacing ΔF can be obtained based on the cycle of a beat signal obtained by synthesizing two pieces of local oscillator. In addition, the optical frequency spacing ΔF can also be calculated based on the cos(ΔF) component or sin(ΔF) component obtained by inputting two pieces of local oscillator to the coherent receivers 22-1 and 22-2. The digital signal processor 25 is configured to determine the phase rotation amount Δf1 caused by the frequency difference between the signal light and one of the two pieces of the local oscillator, obtain the phase rotation amount Δf2 caused by the frequency difference between the signal light and the other of the two pieces of the local oscillator based on the measured ΔF, and compensate the phase rotation amounts Δf1 and Δf2. The other part of the structure is the same as in the first embodiment.

Third Embodiment

Figure 4:
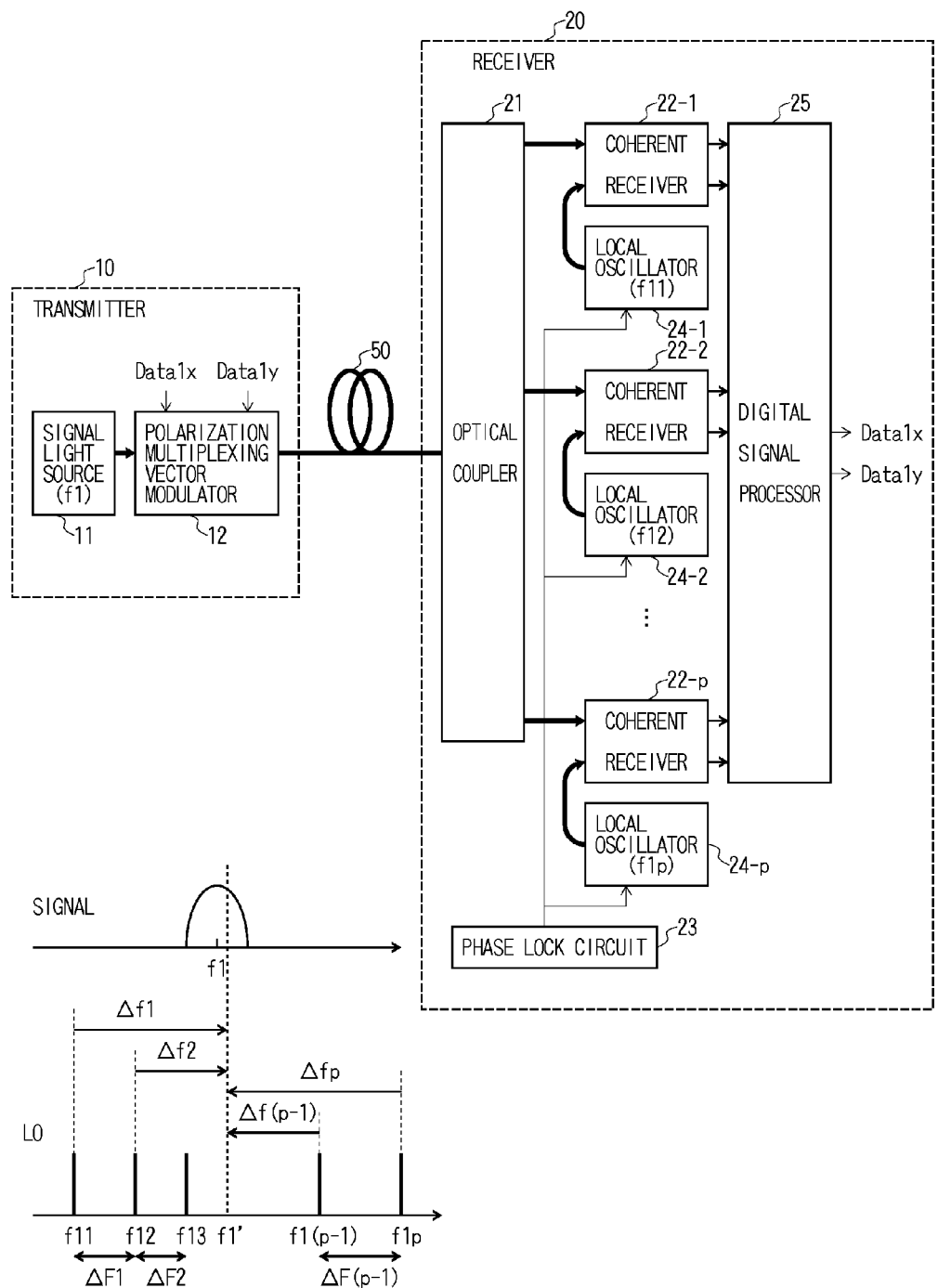
FIG. 4 is a diagram illustrating the structure of a third embodiment of the invention.

FIG. 4 illustrates the structure of a third embodiment of the invention. In FIG. 4, the transmitter 10 is connected to the receiver 20 via the optical fiber transmission line 50 in an optical transmission system according to the third embodiment. The receiver 20 according to the third embodiment is configured to have p coherent receivers. Here, p is an integer equal to or more than 3.

The transmitter 10 includes the signal light source 11 and the polarization multiplexing vector modulator 12. The signal light source 11 outputs an optical carrier signal of the optical frequency f1. The polarization multiplexing vector modulator 12 modulates and multiplexes the optical carrier signal of the optical frequency f1 output from the signal light source 11 with orthogonal polarization using the two data signal sequences Data1x and Data1y and outputs the generated signal light to the optical fiber transmission line 50.

The receiver 20 includes the optical coupler 21, the coherent receivers 22-1 to 22-p, the phase lock circuit 23, the local oscillator light sources 24-1 to 24-p, and the digital signal processor 25. The optical coupler 21 branches the signal light received via the optical fiber transmission line 50 into p pieces and inputs them to the coherent receivers 22-1 to 22-p. The local oscillator light sources 24-1 to 24-p inputs, to the coherent receivers 22-1 to 22-p, the local oscillator of the optical frequencies f11, f12, . . . , f1p close to the optical frequency f1 of the signal light, the local oscillator being controlled by the phase lock circuit 23 to have the predetermined optical frequency spacings ΔF1, ΔF2, . . . , ΔF(p−1). Here, f11<f12< . . . <f1p and ΔF1=f12−f11, . . . , ΔF(p−1)=f1p−f1(p−1) hold. The coherent receiver 22-1 to 22-p perform coherent detection of the signal light of the optical frequency f1 branched by the optical coupler 21 using the local oscillator of the optical frequencies f11 to f1p and output them to the digital signal processor 25. The digital signal processor 25 performs the digital signal processing of electric signals input from the coherent receivers 22-1 to 22-p and demodulates data signal sequences Data1x and Data1y.

In the structure of the third embodiment, the number of pieces of local oscillator of the structure of the first embodiment in FIGS. 1 and 2 is increased to 3 to more and the phase rotation compensation principle is the same. That is, as illustrated in FIG. 4, the optical frequency spacing ΔFj between adjacent pieces of local oscillator is known and adjusted to a constant value. Here, j=1, 2, . . . , p−1. When the frequency difference Δf1 of one of the three or more pieces of local oscillator is set with respect to the virtual reference frequency f1', which is substantially equal to the optical frequency f1 of the signal light, the frequency differences Δf2 to Δfp from the others of the three or more pieces of local oscillator are obtained in sequence as illustrated below.

$$\Delta f2 = \Delta f1 - \Delta F1$$

$$\Delta f3 = \Delta f2 - \Delta F2$$

$$...$$

$$\Delta fp = \Delta f(p-1) - \Delta F(p-1)$$

Accordingly, as in the first embodiment, the digital signal processor 25 illustrated in FIG. 3 can demodulate data signal sequences without being affected by frequency fluctuations of the individual pieces of local oscillator by compensating the phase rotation amounts Δf1 to Δfp included in electric signals input from the coherent receivers 22-1 to 22-p.

Figure 5:
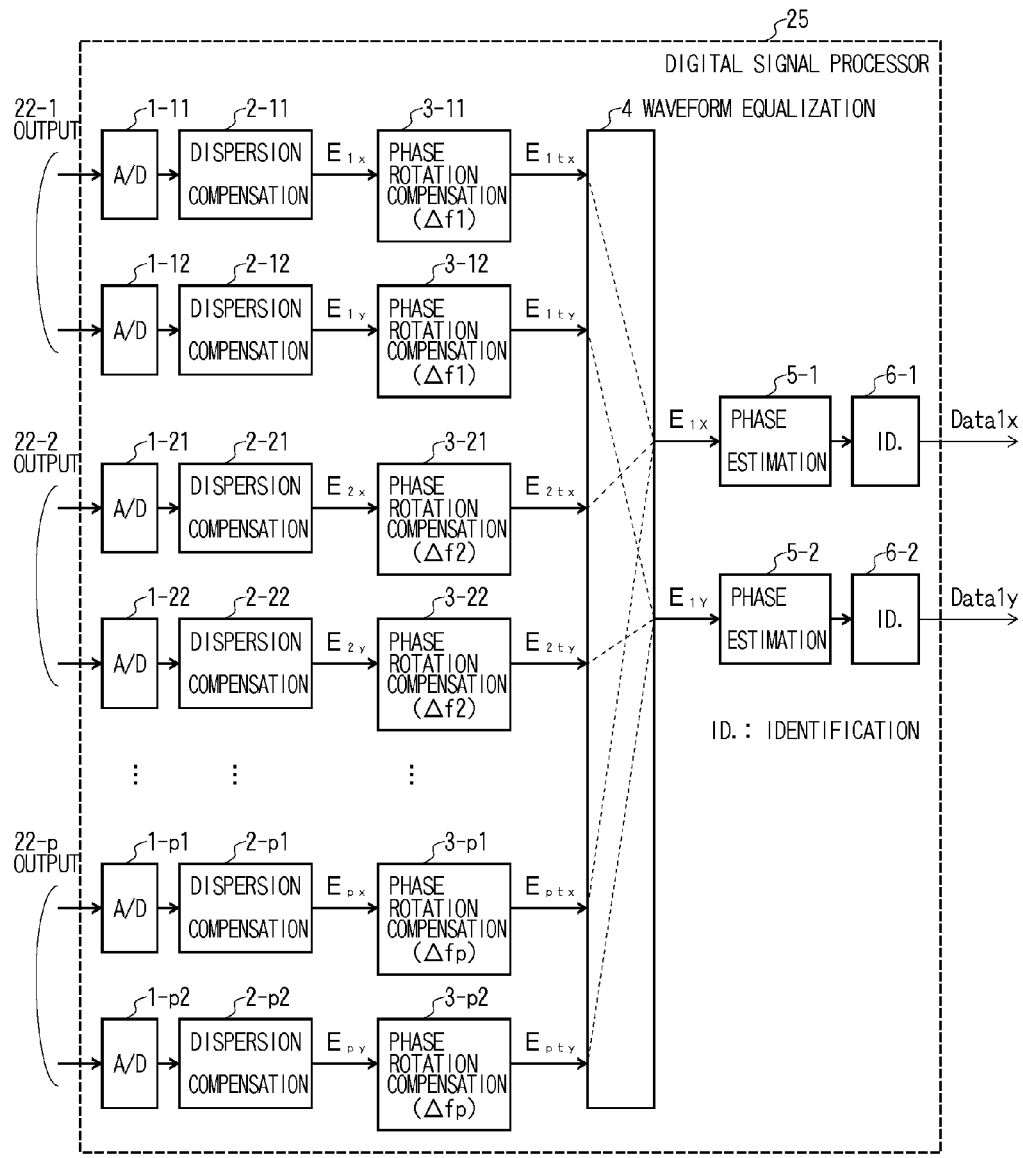
FIG. 5 is a diagram illustrating an example of the structure of the digital signal processor 25 according to the third embodiment.

FIG. 5 illustrates an example of the structure of the digital signal processor 25 according to the third embodiment.

In FIG. 5, two complex signals equivalent to the orthogonal polarization components output from the coherent receivers 22-1 to 22-p are converted by the AD converters 1-11, 1-12, . . . , 1-p1, 1-p2 into digital signals using the sampling period T and then input to dispersion compensation circuits 2-11, 2-12, . . . , 2-p1, 2-p2. The dispersion compensation circuits perform common dispersion compensation, which is equivalent to a total wavelength dispersion amount in the optical fiber transmission line 50, on the input complex signals and outputs the complex signals $E_{1x}, E_{1y}, ..., E_{px}, E_{py}$.

The phase rotation compensation circuits 3-11, 3-12, . . . , 3-p1, 3-p2 receive the complex signals $E_{1x}, E_{1y}, ..., E_{px}, E_{py}$ and output the complex signals $E_{1tx}, E_{1ty}, ..., E_{ptx}, E_{pty}$ obtained by compensating the phase rotation amounts Δf1 to Δfp caused by the frequency difference between the signal light and the individual pieces of local oscillator.

The waveform equalization circuit 4 receives the complex signals $E_{1tx}, E_{1ty}, ..., E_{ptx}, E_{pty}$ output from the phase rotation compensation circuits 3-11, 3-12, . . . , 3-p1, 3-p2, performs the adaptive signal processing of the FIR filter using maximum likelihood estimation for each polarization component, and outputs complex signals $E_{1X}$ and $E_{1Y}$. The complex signals $E_{1X}$ and $E_{1Y}$ include phase rotation residual components caused by the phase difference and the frequency difference between the optical frequency f1 of the signal light and the virtual reference frequency f1' of the individual pieces of local oscillator.

Phase estimation circuits 5-1 and 5-2 output, to identification circuits 6-1 and 6-2, the complex signals obtained by compensating the phase rotation residual components of the complex signals $E_{1X}$ and $E_{1Y}$ input from the waveform equalization circuit 4. The identification circuits 6-1 and 6-2 demodulate the data signal sequences Data1x and Data1y from the input complex signals and output them.

Fourth Embodiment

A fourth embodiment is configured to have a frequency difference measurement device that measures the optical frequency spacings of p pieces of local oscillator as ΔF1' to ΔF(p−1)' instead of adjusting the optical frequency spacings to ΔF1 to ΔF(p−1), in place of the phase lock circuit 23 according to the third embodiment. The frequency difference measurement device may have a structure similar to that in the second embodiment. The digital signal processor 25 is configured to determine the phase rotation amount Δf1 caused by the frequency difference between the signal light and one of the p pieces of local oscillator, sequentially obtain the phase rotation amounts Δf2 to Δfp caused by the frequency difference between the signal light and the others of the p pieces of the local oscillator based on the measured frequency spacings ΔF1' to ΔF(p−1)', and compensate the phase rotation amounts Δf1 to Δfp. The other part of the structure is the same as in the first embodiment.

Fifth Embodiment

FIG. 6 illustrates the structure of a fifth embodiment of the invention.

In FIG. 6, the transmitter 10 is connected to the receiver 20 via the optical fiber transmission line 50 in an optical transmission system according to the fifth embodiment. The transmitter 10 according to the fifth embodiment is configured to wavelength-multiplex and transmit the signal light of optical frequencies f1 and f2.

The transmitter 10 includes signal light sources 11-1 and 11-2, polarization multiplexing vector modulators 12-1 and 12-2, and a wavelength multiplexer 13. The signal light source 11-1 outputs the optical carrier signal of the optical frequency f1. The signal light source 11-2 outputs the optical carrier signal of the optical frequency f2. Here, f1<f2 holds. The polarization multiplexing vector modulator 12-1 modulates and multiplexes the optical carrier signal of the optical frequency f1 output from the signal light source 11-1 with orthogonal polarization using the two data signal sequences Data1x and Data1y to generate signal light. The polarization multiplexing vector modulator 12-2 modulates and multiplexes the optical carrier signal of the optical frequency f2 output from the signal light source 11-2 with orthogonal polarization using two data signal sequences Data2x and Data2y to generate signal light. The wavelength multiplexer 13 multiplexes the signal light of the optical frequency f1 and the signal light of the optical frequency f2 output from the polarization multiplexing vector modulators 12-1 and 12-2 and outputs the multiplexed signal light to the optical fiber transmission line 50.

The receiver 20 includes the optical coupler 21, the coherent receivers 22-1 and 22-2, the phase lock circuit 23, the local oscillator light sources 24-1 and 24-2, and the digital signal processor 25. The optical coupler 21 branches the signal light received via the optical fiber transmission line 50 into two pieces and inputs them to the coherent receivers 22-1 and 22-2. The local oscillator light source 24-1 inputs, to the coherent receiver 22-1, the local oscillator of the optical frequency f11 close to the optical frequency f1 of the signal light. The local oscillator light source 24-2 inputs, to the coherent receiver 22-2, the local oscillator of the optical frequency f12 close to the optical frequency f2 of the signal light. The optical frequencies f11 and f12 of the two pieces of local oscillator are controlled by the phase lock circuit 23 to have the predetermined optical frequency spacing ΔF. Here, f11<f12 and ΔF=f12−f11 hold. The coherent receiver 22-1 performs coherent detection of the signal light of optical frequencies f1 and f2 branched by the optical coupler 21 using the local oscillator of the optical frequency f11 and outputs it to the digital signal processor 25. The coherent receiver 22-2 performs coherent detection of the signal light of optical frequencies f1 and f2 branched by the optical coupler 21 using the local oscillator of the optical frequency f12 and output it to the digital signal processor 25. The digital signal processor 25 performs the digital signal processing of electric signals input from the coherent receivers 22-1 and 22-2 and demodulates the data signal sequences Data1x and Data1y and the data signal sequences Data2x and Data2y.

In the fifth embodiment, although the optical frequencies f11 and f12 of the local oscillator light sources 24-1 and 24-2 are set to values close to the optical frequencies f1 and f2 of signal light, the phase lock circuit 23 adjusts the optical frequency spacing ΔF between the two pieces of local oscillator to a specified value. With this adjustment, as illustrated in FIG. 6, when the frequency difference Δf11 of one of the two pieces of local oscillator is set with respect to the virtual reference frequency f1' substantially equal to the optical frequency f1 of one of the two pieces of the signal light, the frequency difference Δf21 from the other of the two pieces of the local oscillator is obtained as illustrated below.

$$\Delta f21 = \Delta f11 - \Delta F$$

In addition, the frequency difference Δf12 of one of the two pieces of local oscillator is set with respect to the virtual reference frequency f2' substantially equal to the optical frequency f2 of the other of the two pieces of the signal light, the frequency difference Δf22 from the other of the two pieces of the local oscillator is obtained as illustrated below.

$$\Delta f22 = \Delta f12 - \Delta F$$

That is, when the phase rotation amounts Δf11 and Δf12 of one of the two piece of local oscillator are determined based on the virtual reference frequencies f1' and f2' close to the optical frequencies f1 and f2 of the individual pieces of signal light, the phase rotation amounts Δf21 and Δf22 of the other of the two pieces of local oscillator are obtained. In the phase rotation compensation circuits of the digital signal processor 25, by compensating the phase rotation amounts Δf11 and Δf12 of one of the two pieces of local oscillator included in electric signals input from the coherent receiver 22-1 and 22-2 and compensating the phase rotation amounts Δf21 and Δf22 of the other of the two pieces of local oscillator, the data signal sequences of the individual pieces of wavelength-multiplexed and transmitted signal light can be demodulated without being affected by frequency fluctuations of the individual pieces of local oscillator.

Figure 7:
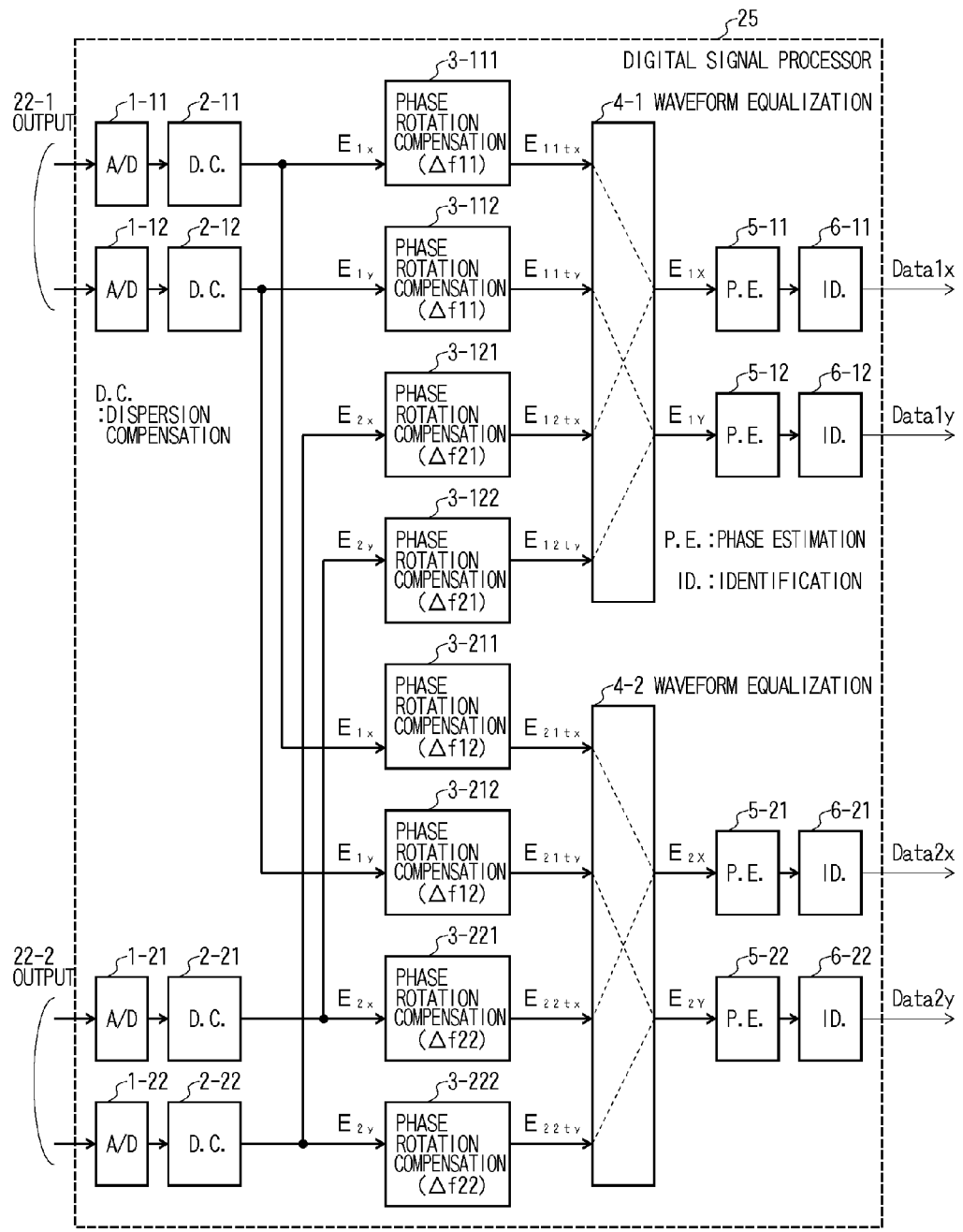
FIG. 7 is a diagram illustrating an example of the structure of the digital signal processor 25 according to the fifth embodiment.

FIG. 7 illustrates an example of the structure of the digital signal processor 25 according to the fifth embodiment.

In FIG. 7, two complex signals equivalent to the orthogonal polarization components output from the coherent receivers 22-1 and 22-2 are converted by the AD converters 1-11, 1-12, 1-21, and 1-22 into digital signals using the sampling period T and then input to the dispersion compensation circuits 2-11, 2-12, 2-21, and 2-22. The dispersion compensation circuits perform common dispersion compensation, which is equivalent to a total wavelength dispersion amount in the optical fiber transmission line 50, on the input complex signals and outputs complex signals $E_{1x}$, $E_{1y}$, $E_{2x}$, and $E_{2y}$.

Phase rotation compensation circuit 3-111 and 3-112 receive the complex signals $E_{1x}$ and $E_{1y}$ and output complex signals $E_{11tx}$ and $E_{11ty}$ obtained by compensating the phase rotation amount Δf11 caused by the frequency difference between the signal light of the optical frequency f1 and the local oscillator of the optical frequency f11. Phase rotation compensation circuit 3-121 and 3-122 receive the complex signals $E_{2x}$ and $E_{2y}$ and output complex signals $E_{12tx}$ and $E_{12ty}$ obtained by compensating the phase rotation amount Δf21 caused by the frequency difference between the signal light of the optical frequency f1 and the local oscillator of the optical frequency f12.

Phase rotation compensation circuit 3-211 and 3-212 receive the complex signals $E_{1x}$ and $E_{1y}$ and output complex signals $E_{21tx}$ and $E_{21ty}$ obtained by compensating the phase rotation amount Δf12 caused by the frequency difference between the signal light of the optical frequency f2 and the local oscillator of the optical frequency f11. Phase rotation compensation circuit 3-221 and 3-222 receive the complex signals $E_{2x}$ and $E_{2y}$ and output complex signals $E_{22tx}$ and $E_{22ty}$ obtained by compensating the phase rotation amount Δf22 caused by the frequency difference between the signal light of the optical frequency f2 and the local oscillator of the optical frequency f12.

A waveform equalization circuit 4-1 receives the complex signals $E_{11tx}$, $E_{11ty}$, $E_{12tx}$, and $E_{12ty}$ output from the phase rotation compensation circuits 3-111, 3-112, 3-121, and 3-122, performs the adaptive signal processing of the FIR filter using maximum likelihood estimation for each polarization component, and outputs complex signals $E_{1X}$ and $E_{1Y}$. The complex signals $E_{1X}$ and $E_{1Y}$ include phase rotation residual components caused by the phase difference and the frequency difference between the optical frequency f1 of the signal light and the virtual reference frequency f1' of the individual pieces of local oscillator.

Phase estimation circuits 5-11 and 5-12 output, to identification circuits 6-11 and 6-12, the complex signals obtained by compensating the phase rotation residual components of the complex signals $E_{1X}$ and $E_{1Y}$ input from the waveform equalization circuit 4. The identification circuits 6-11 and 6-12 demodulate the data signal sequences Data1x and Data1y from the input complex signals and output them.

A waveform equalization circuit 4-2 receives the complex signals $E_{21tx}$, $E_{21ty}$, $E_{22tx}$, and $E_{22ty}$ output from the phase rotation compensation circuits 3-211, 3-212, 3-221, and 3-222, performs the adaptive signal processing of the FIR filter using maximum likelihood estimation for each polarization component, and outputs complex signals $E_{2X}$ and $E_{2Y}$. The complex signals $E_{2X}$ and $E_{2Y}$ include phase rotation residual components caused by the phase difference and the frequency difference between the optical frequency f2 of the signal light and the virtual reference frequency f2' of the individual pieces of local oscillator.

Phase estimation circuits 5-21 and 5-22 output, to identification circuits 6-21 and 6-22, the complex signals obtained by compensating the phase rotation residual components of the complex signals $E_{2X}$ and $E_{2Y}$ input from a waveform equalization circuit 4-2. The identification circuits 6-21 and 6-22 demodulate the data signal sequences Data2x and Data2y from the input complex signals and output them.

FIG. 13 illustrates examples of demodulation signals in the conventional structure and in the structure according to the fifth embodiment. The drawing illustrates the results of an experiment of application to two 128 Gbit/s DP-QPSK signals that have wavelength-multiplexed with a frequency spacing Δf of 25 GHz. The OSNR during reception was adjusted to 15 dB. For a demodulate signal using the conventional CMA, the limit of wavelength multiplexing separation was the frequency spacing 32 GHz for an optical signal having a symbol rate of 32 Gboud. On the other hand, in the structure according to the invention, for an optical signal having a symbol rate of 32 Gboud, since the crosstalk component is separated for wavelength-multiplex signal with the frequency spacing 25 GHz, the demodulate of the DP-QPSK signal was confirmed.

Sixth Embodiment

A sixth embodiment is configured to have a frequency difference measurement device that measures the optical frequency spacing of the individual pieces of local oscillator as ΔF1' instead of adjusting the optical frequency spacing to ΔF, in place of the phase lock circuit 23 according to the fifth embodiment. The frequency difference measurement device may have a structure similar to that in the second embodiment. The digital signal processor 25 is configured to determine the phase rotation amounts Δf11 and Δf12 caused by the frequency difference between the individual pieces of the signal light and one of the two pieces of local oscillator, obtain the phase rotation amounts Δf21 and Δf22 caused by the frequency difference between the individual pieces of the signal light and the other of the two pieces of local oscillator based on the measured optical frequency spacing ΔF', and compensate the phase rotation amounts Δf11, Δf12, Δf21, and Δf22. The other part of the structure is the same as in the first embodiment.

As described above, the first embodiment has the structure in which one of the two pieces of signal light is detected by two coherent receivers to obtain electric signals, the electric signals are input to the digital signal processor, and the electric signals are subjected to phase rotation compensation and diversity signal processing to demodulate the signal light. The third embodiment has the structure in which one of the two pieces of signal light is detected by p coherent receivers to obtain electric signals, the electric signals are input to the digital signal processor, and the electric signals are subjected to phase rotation compensation and diversity signal processing to demodulate the signal light. By increasing the number of coherent receivers as described above, the diversity effect can be improved.

The fifth embodiment has the structure in which two pieces of signal light are detected by two coherent receivers to obtain electric signals, the electric signals are input to the digital signal processor, signals output from the dispersion compensation circuits corresponding to the coherent receivers are branched into two, which is the same as the number of pieces of signal light, and the signals are subjected to phase rotation compensation and diversity signal processing to demodulate the two signal lights. Even when two pieces of signal light are wavelength-multiplexed and transmitted as described above, by sharing the two coherent receivers among the individual pieces of signal light and branching the signal light in the digital signal processor to perform processing for each piece of signal light, the two pieces of signal light can be separated and demodulated at the minimum structure.

Similarly, as in the third embodiment illustrated in FIGS. 4 and 5, it is also possible to use three or more coherent receivers for two pieces of signal light, perform similar processing in the digital signal processor by branching the signals output from the dispersion compensation circuits corresponding to the coherent receivers into the same number as in the number of pieces of signal light, and improve the diversity effect.

In addition, as in the fifth embodiment illustrated in FIGS. 6 and 7, it is also possible to use a plurality of coherent receivers for three or more pieces of signal light, perform similar processing in the digital signal processor by branching the signals output from the dispersion compensation circuits corresponding to the coherent receivers into the same number as in the number of pieces of signal light, and improve the diversity effect.

Seventh Embodiment

As a seventh embodiment, an example of the structure in which three coherent receivers are used for two pieces of signal light will be described below.

Figure 8:
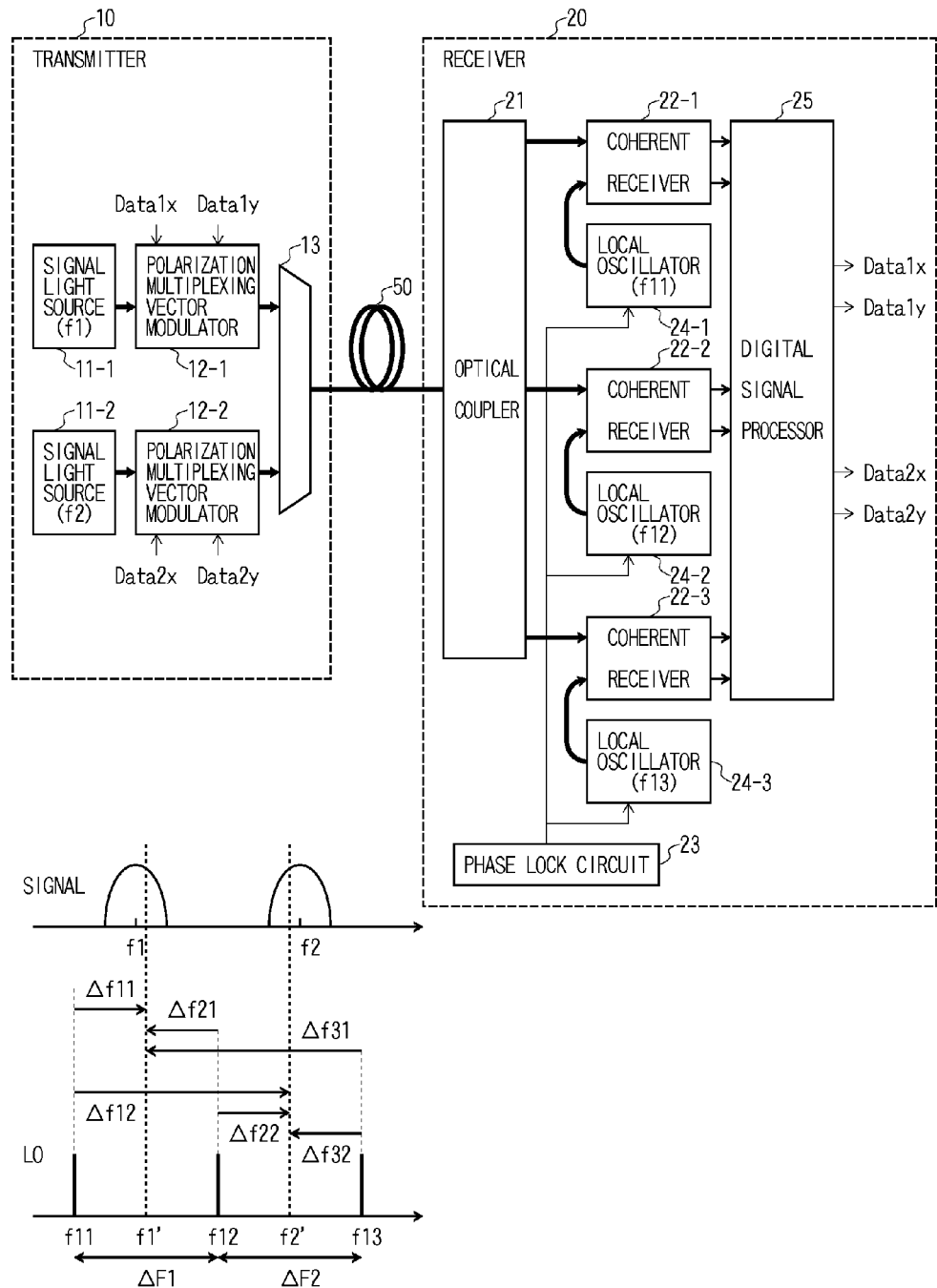
FIG. 8 is a diagram illustrating the structure of a seventh embodiment of the invention.

FIG. 8 illustrates the structure of a seventh embodiment of the invention.

In FIG. 8, the transmitter 10 is connected to the receiver 20 via the optical fiber transmission line 50 in an optical transmission system according to the seventh embodiment. The transmitter 10 according to the seventh embodiment is configured to wavelength-multiplex and transmit the signal light of optical frequencies f1 and f2.

The transmitter 10 includes the signal light sources 11-1 and 11-2, the polarization multiplexing vector modulators 12-1 and 12-2, and the wavelength multiplexer 13. The signal light source 11-1 outputs the optical carrier signal of the optical frequency f1. The signal light source 11-2 outputs the optical carrier signal of the optical frequency f2. Here, f1<f2 holds. The polarization multiplexing vector modulator 12-1 modulates and multiplexes the optical carrier signal of the optical frequency f1 output from the signal light source 11-1 with orthogonal polarization using the two data signal sequences Data1x and Data1y to generate signal light. The polarization multiplexing vector modulator 12-2 modulates and multiplexes the optical carrier signal of the optical frequency f2 output from the signal light source 11-2 with orthogonal polarization using the two data signal sequences Data2x and Data2y to generate signal light. The wavelength multiplexer 13 multiplexes the signal light of the optical frequency f1 and the signal light of the optical frequency f2 output from the polarization multiplexing vector modulators 12-1 and 12-2 and outputs the multiplexed signal light to the optical fiber transmission line 50.

The receiver 20 includes the optical coupler 21, the coherent receivers 22-1 to 22-3, the phase lock circuit 23, the local oscillator light sources 24-1 to 24-3, and the digital signal processor 25. The optical coupler 21 branches the wavelength-multiplex signal light received via the optical fiber transmission line 50 into three pieces and inputs them to the coherent receiver 22-1 to 22-3. The local oscillator light source 24-1 inputs, to the coherent receiver 22-1, the local oscillator of the optical frequency f11 close to the optical frequency f1 of the signal light. The local oscillator light source 24-2 inputs, to the coherent receiver 22-2, the local oscillator of the optical frequency f12 close to the optical frequencies f1 and f2 of the signal light. The local oscillator light source 24-3 inputs, to the coherent receiver 22-3, the local oscillator of the optical frequency f13 close to the optical frequency f2 of the signal light. The optical frequencies f11, f12, and f13 of the local oscillator are controlled by the phase lock circuit 23 to have the predetermined optical frequency spacings ΔF1 and ΔF2. Here, f11<f12<f13, ΔF1=f12−f11, and ΔF2=f13−f12 hold. The coherent receivers 22-1 to 22-3 perform coherent detection of the signal light of the optical frequencies f1 and f2 branched by the optical coupler 21 using the local oscillator of the optical frequencies f11, f12, and f13 and outputs them to the digital signal processor 25. The digital signal processor 25 performs the digital signal processing of electric signals input from the coherent receivers 22-1 to 22-3 and demodulates the data signal sequences Data1x and Data1y and the data signal sequences Data2x and Data1y.

In the seventh embodiment, although the optical frequencies f11, f12, and f13 of the local oscillator light sources 24-1 to 24-3 are set to values close to the optical frequencies f1 and f2 of the signal light, the phase lock circuit 23 adjusts the optical frequency spacings ΔF1 and ΔF2 of the three pieces of local oscillator to specified values. With this adjustment, as illustrated in FIG. 8, when the frequency difference Δf11 of the local oscillator light source 24-1 is set with respect to the virtual reference frequency f1' substantially equal to the optical frequency f1 of one of the two pieces of signal light, the frequency differences Δf21 and Δf31 from the others of the three pieces of local oscillator are obtained as illustrated below.

Δf21=Δf11−ΔF1

Δf31=Δf21−ΔF2

Alternatively, the frequency difference Δf12 of the local oscillator light source 24-1 is set with respect to the virtual reference frequency f2' substantially equal to the optical frequency f2 of the other of the two pieces of the signal light, the frequency differences Δf22 and Δf32 with the others of the three pieces of the local oscillator are obtained as illustrated below.

Δf22=Δf12−ΔF1

Δf32=Δf22−ΔF2

That is, when the phase rotation amounts Δf11 and Δf12 of one of the three pieces of local oscillator are determined based on the virtual reference frequencies f1' and f2' close to the optical frequencies f1 and f2 of the individual pieces of signal light, the phase rotation amounts Δf21, Δf31, Δf22, and Δf32 of the others of the three pieces of local oscillator are obtained. In the phase rotation compensation circuits of the digital signal processor 25, by compensating the phase rotation amounts Δf11 and Δf12 of one of the three pieces of local oscillator included in electric signals input from the coherent receivers 22-1 to 22-3 and compensating the phase rotation amounts Δf21, Δf31, Δf22, and Δf32 of the others of the three pieces of local oscillator, the data signal sequences of the individual pieces of wavelength-multiplexed and transmitted signal light can be demodulated without being affected by frequency fluctuations of the individual pieces of local oscillator.

Similarly in the seventh embodiment, as in the second embodiment illustrated in FIG. 3, it is possible to measure the optical frequency spacings of the three pieces of local oscillator as ΔF1' and ΔF2' instead of adjusting the optical frequency spacings to ΔF1 and ΔF2 and give them to the digital signal processor 25.

Eighth Embodiment

FIG. 9 illustrates the structure of an eighth embodiment of the invention.

In FIG. 9, an optical transmission system according to the eighth embodiment is set so that the optical frequencies f1 and f2 of the signal light sources 11-1 and 11-2 of the transmitter 10 in the optical transmission system according to the fifth embodiment illustrated in FIG. 6 are substantially equal to the optical frequencies f11 and f12 of the local oscillator light sources 24-1 and 24-2 of the receiver 20. That is, the optical frequency f11 of the local oscillator light source 24-1 is set to the frequency f1', which is substantially equal to the optical frequency f1 of one of the two pieces of signal light, and the optical frequency f12 of the local oscillator light source 24-2 is set to the frequency f2', which is substantially equal to the optical frequency f2 of the other of the two pieces of signal light.

In addition, the optical frequencies f1 and f2 of the signal light sources 11-1 and 11-2 of the transmitter 10 are controlled to have the predetermined optical frequency spacing ΔF by a phase lock circuit 14. The optical frequencies f11 and f12 of the local oscillator light sources 24-1 and 24-2 of the receiver 20 are controlled to have the predetermined optical frequency spacing ΔF by the phase lock circuit 23. Accordingly, two pieces of signal light and two pieces of local oscillator are kept to have substantially the same optical frequency relationship while being controlled to have the same optical frequency spacing ΔF.

In the eighth embodiment, although the optical frequencies f11 and f12 of the local oscillator light sources 24-1 and 24-2 are set to the optical frequencies f1' and f2' substantially equal to the optical frequencies f1 and f2 of signal light, the phase lock circuits 14 and 23 adjust the optical frequency spacing ΔF between the two pieces of signal light and between the two pieces of local oscillator to a specified value. With this adjustment, when the optical frequency of the one of the two local oscillators is set so that f11=f1' holds, the optical frequency of the other of the two local oscillators is controlled so that f12=f2' holds and Δf11, Δf12, Δf21, and Δf22 corresponding to FIG. 6 are set as illustrated below.

Δf11=0
Δf22=0
Δf12=ΔF
Δf21=−ΔF

That is, when the phase rotation amount Δf12 of one of the two pieces of local oscillator is determined based on the frequencies f1' and f2' substantially equal to the optical frequencies f1 and f2 of the individual pieces of signal light, the phase rotation amount Δf21 of the other of the two pieces of local oscillator is obtained. In the phase rotation compensation circuits of the digital signal processor 25, by compensating the phase rotation amounts Δf12 and Δf21 of the other of the two pieces of local oscillator included in electric signals input from the coherent receivers 22-1 and 22-2, the data signal sequences of the individual pieces of wavelength-multiplexed and transmitted signal light can be demodulated without being affected by frequency fluctuations of the individual pieces of local oscillator.

Figure 10:
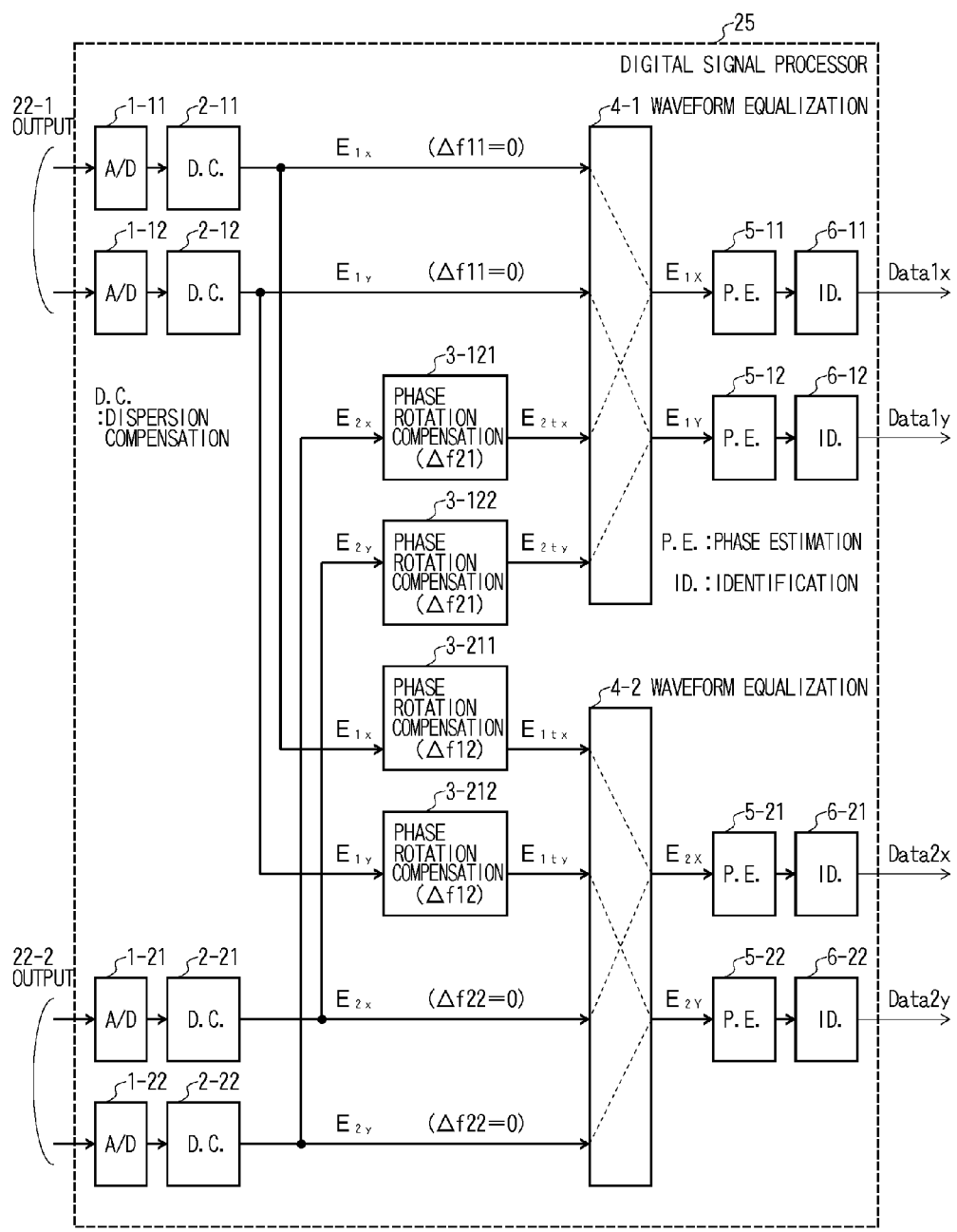
FIG. 10 is a diagram illustrating an example of the structure of the digital signal processor 25 according to the eighth embodiment.

FIG. 10 illustrates an example of the structure of the digital signal processor 25 according to the eighth embodiment. In FIG. 10, two complex signals equivalent to the orthogonal polarization components output from each of the coherent receivers 22-1 and 22-2 are converted by the AD converters 1-11, 1-12, 1-21, and 1-22 into digital signals using the sampling period T and then input to the dispersion compensation circuits 2-11, 2-12, 2-21, and 2-22. The dispersion compensation circuits perform common dispersion compensation, which is equivalent to a total wavelength dispersion amount in the optical fiber transmission line 50, on the input complex signals and outputs complex signals $E_{1x}$, $E_{1y}$, $E_{2x}$, and $E_{2y}$.

The complex signals $E_{1x}$ and $E_{1y}$ output from the dispersion compensation circuits 2-11 and 2-12 are input to the waveform equalization circuit 4-1 as is. The phase rotation compensation circuits 3-121 and 3-122 receive the complex signals $E_{2x}$ and $E_{2y}$ from the dispersion compensation circuits 2-21 and 2-22 and output the complex signals $E_{2tx}$ and $E_{2ty}$ obtained by compensating the phase rotation amount $\Delta f21$ caused by the frequency difference between the signal light of the optical frequency f1 and the local oscillator of the optical frequency f12.

The complex signals $E_{2x}$ and $E_{2y}$ output from the dispersion compensation circuits 2-21 and 2-22 are input to the waveform equalization circuit 4-2 as is. The phase rotation compensation circuits 3-221 and 3-222 receive the complex signals $E_{1x}$ and $E_{1y}$ from the dispersion compensation circuits 2-11 and 2-12 and output the complex signals $E_{1tx}$ and $E_{1ty}$ obtained by compensating the phase rotation amount $\Delta f12$ caused by the frequency difference between the signal light of the optical frequency f2 and the local oscillator of the optical frequency f11.

The waveform equalization circuit 4-1 receives the complex signals $E_{1x}$, $E_{1y}$, $E_{2tx}$, and $E_{2ty}$, performs the adaptive signal processing of the FIR filter using maximum likelihood estimation for each polarization component, and outputs the complex signals $E_{1X}$ and $E_{1Y}$. The complex signals $E_{1X}$ and $E_{1Y}$ include phase rotation residual components caused by the phase difference and the frequency difference between the optical frequency f1 of the signal light and the optical frequency f11 of the individual pieces of local oscillator.

Phase estimation circuits 5-11 and 5-12, output to the identification circuits 6-11 and 6-12, the complex signals obtained by compensating the phase rotation residual components of the complex signals $E_{1X}$ and $E_{1Y}$ input from the waveform equalization circuit 4-1. The identification circuits 6-11 and 6-12 demodulate the data signal sequences Data1x and Data1y from the input complex signals and output them.

The waveform equalization circuit 4-2 receives the complex signals $E_{2x}$, $E_{2y}$, $E_{1tx}$, and $E_{1ty}$, performs the adaptive signal processing of the FIR filter using maximum likelihood estimation for each polarization component, and outputs the complex signals $E_{2X}$ and $E_{2Y}$. The complex signals $E_{2X}$ and $E_{2Y}$ include phase rotation residual components caused by the phase difference and the frequency difference between the optical frequency f2 of the signal light and the optical frequency f12 of the individual pieces of local oscillator.

The phase estimation circuits 5-21 and 5-22 output, to identification circuits 6-21 and 6-22, the complex signals obtained by compensating the phase rotation residual components of the complex signals $E_{2X}$ and $E_{1Y}$ input from a waveform equalization circuit 4-2. The identification circuits 6-21 and 6-22 demodulate the data signal sequences Data2x and Data1y from the input complex signals and output them.

Ninth Embodiment

Figure 11:
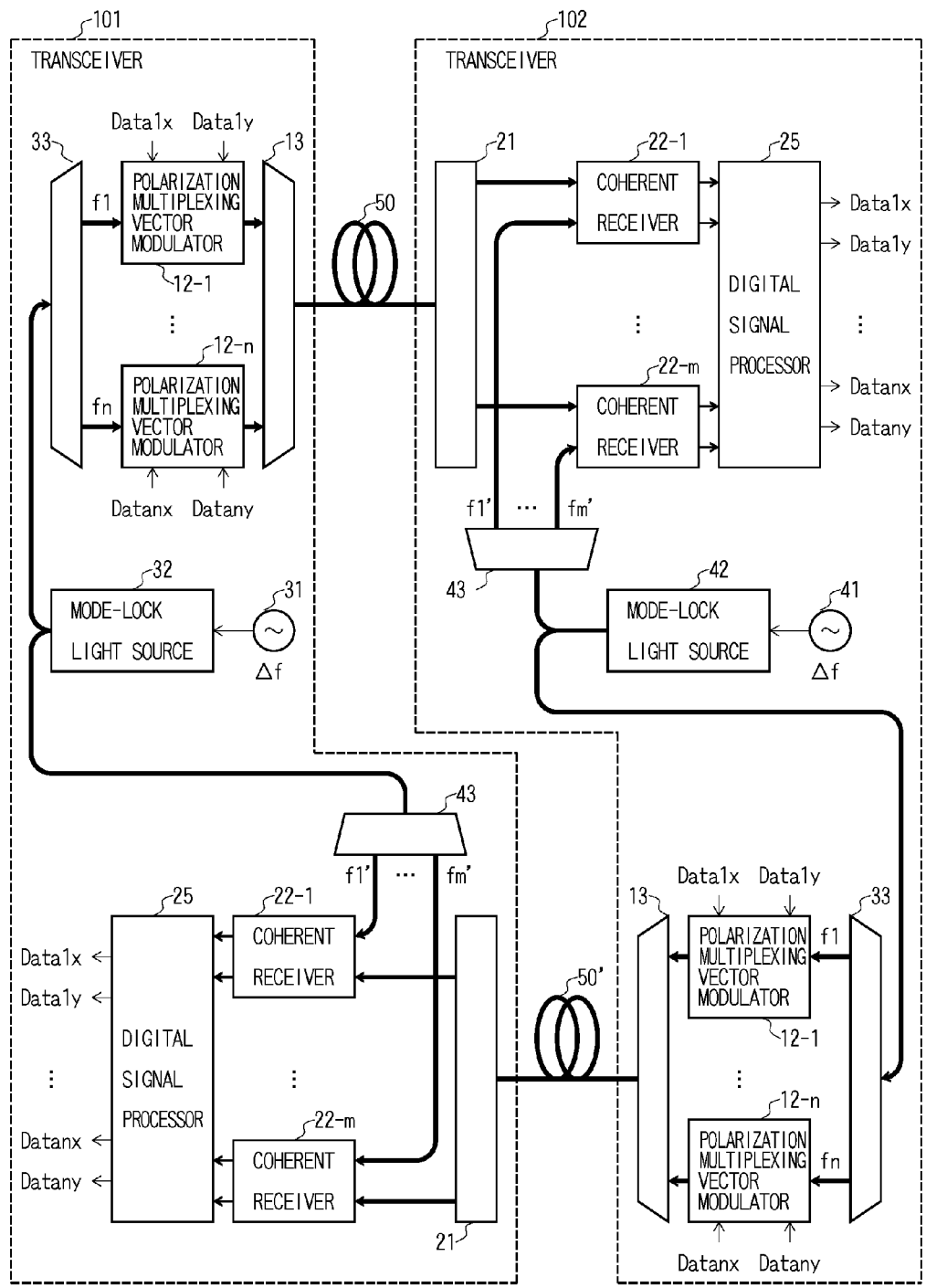
FIG. 11 is a diagram illustrating the structure of a ninth embodiment of the invention.

FIG. 11 illustrates the structure of a ninth embodiment of the invention.

In FIG. 11, the optical transmission system according to ninth embodiment uses mode-lock light sources 32 and 42 in place of the signal light sources 11-1 and 11-2 controlled by the phase lock circuit 14 and the local oscillator light sources 24-1 and 24-2 controlled by the phase lock circuit 23 in the eighth embodiment, respectively, and has a common structure for both transmission and reception. That is, the signal light modulated and multiplexed with orthogonal polarization and then wavelength-multiplexed by a transceiver 101 is transmitted to a transceiver 102 via the optical fiber transmission line 50, demodulated by the transceiver 102, modulated and multiplexed with orthogonal polarization and then wavelength-multiplexed by the transceiver 102, transmitted to the transceiver 101 via the optical fiber transmission line 50', and demodulated by the transceiver 101.

The mode-lock light source 32 of the transceiver 101 generates n pieces of uniform continuous wave light of frequencies f1, f2, . . . , fn having a frequency spacing $\Delta f$ and phase-locked based on a signal of frequency $\Delta f$ input from an oscillator 31. Here, n represents an integer equal to or more than 2 and f1<f2< . . . <fn holds. A wavelength demultiplexer 33 demultiplexes an output from the mode-lock light source 32 into n pieces of uniform continuous wave light having the frequency spacing $\Delta f$ and inputs them to the wavelength multiplex vector modulators 12-1 to 12-n, respectively. The other of the structure is the same as in the eighth embodiment illustrated in FIG. 9.

The mode-lock light source 42 of the transceiver 102 generates m pieces of uniform continuous wave light of frequencies f1', f2', . . . , fm' having the frequency spacing $\Delta f$ and phase-locked based on a signal of frequency $\Delta f$ input from an oscillator 41. Here, m represents an integer equal to or more than 2 and f1'<f2'< . . . <fm' holds. A wavelength demultiplexer 43 branches an output from the mode-lock light source 42 into m pieces of uniform continuous wave light having the frequency spacing $\Delta f$ and inputs them to coherent receivers 22-1 to 22-m, respectively. The other of the structure is the same as in the eighth embodiment illustrated in FIG. 9.

In addition, the mode-lock light source 42 of the transceiver 102 also generates n pieces of uniform continuous wave light of frequencies f1, f2, . . . , fn having the frequency spacing $\Delta f$ as in the mode-lock light source 32 of the transceiver 101. The wavelength demultiplexer 33 demultiplexes an output from the mode-lock light source 32 into n pieces of continuous wave light having the frequency spacing $\Delta f$ and inputs them to the wavelength multiplex vector modulators 12-1 to 12-n, respectively. The other of the structure is the same as in the eighth embodiment illustrated in FIG. 9.

The mode-lock light source 32 of the transceiver 101 also generates m pieces of uniform continuous wave light of frequencies f1', f2', . . . , fm' having the frequency spacing $\Delta f$ as in the mode-lock light source 42 of the transceiver 102. The wavelength demultiplexer 43 demultiplexes an output from the mode-lock light source 32 into m pieces of continuous wave light having the frequency spacing $\Delta f$ and inputs them to the coherent receivers 22-1 to 22-m, respectively. The other of the structure is the same as in the eighth embodiment illustrated in FIG. 9.

The above structure enables the bidirectional transmission of signal light while the mode-lock light sources 32 and 42 are shared between the transceiver 101 and the transceiver 102.

In the first embodiment illustrated in FIG. 1, the third embodiment illustrated in FIG. 4, the fifth embodiment illustrated in FIG. 6, and the seventh embodiment illustrated in FIG. 8, the local oscillators controlled by the phase lock circuit 23 may be replaced with the mode-lock light sources in the ninth embodiment.

Tenth Embodiment

Figure 14:
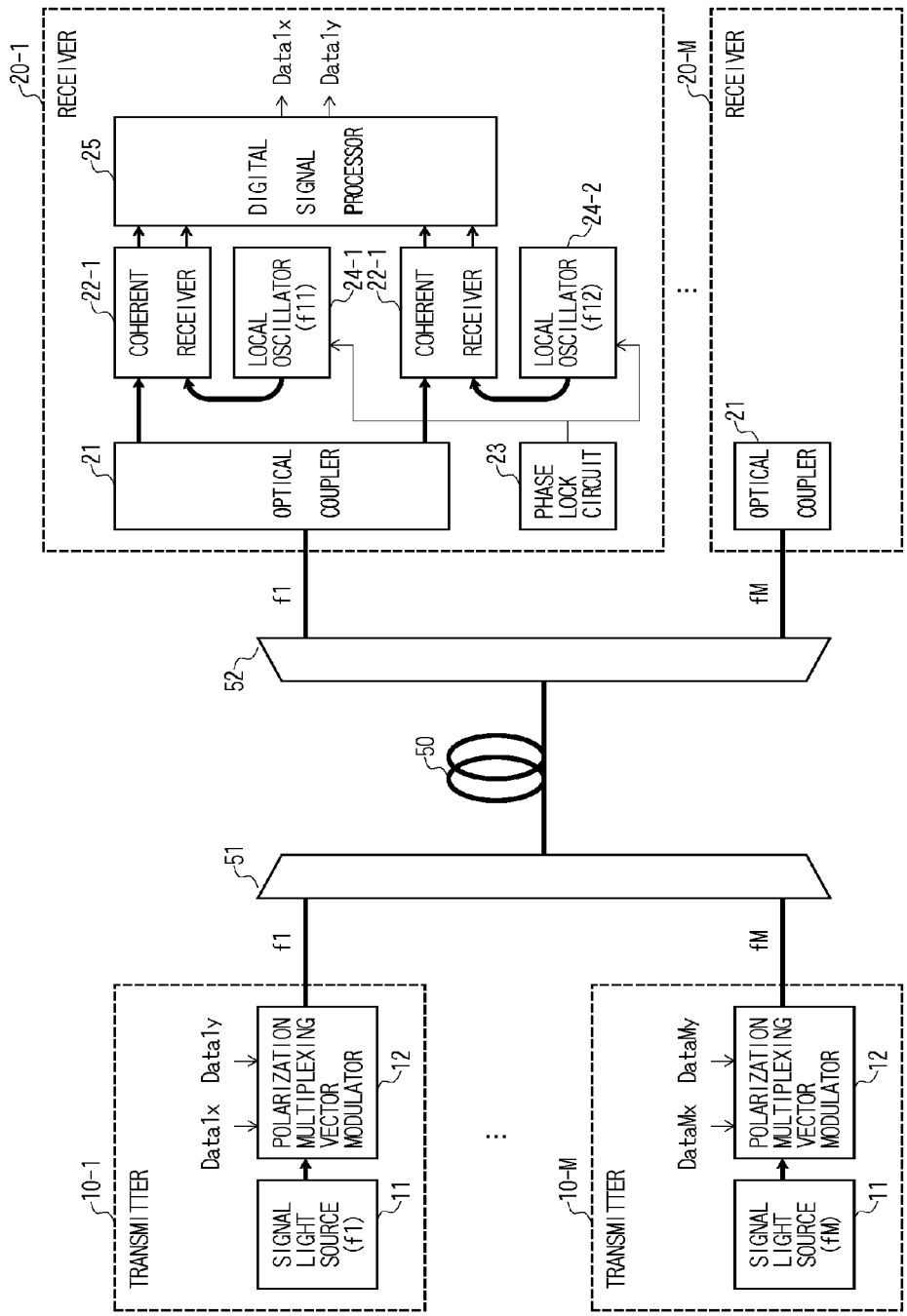
FIG. 14 is a diagram illustrating the structure of a tenth embodiment of the invention.

FIG. 14 illustrates the structure of a tenth embodiment of the invention.

In FIG. 14, the optical transmission system according to the tenth embodiment is configured to have M transmitters 10-1 to 10-M similar to the transmitter 10 according to the first embodiment illustrated in FIG. 1 and M receivers 20-1 to 20-M similar to the receiver 20, and wavelength-multiplex and transmit signal light of different optical frequencies via the optical fiber transmission line 50. Here, M is an integer equal to or more than 2.

The transmitter 10-1 outputs signal light of the optical frequency f1 modulated and multiplexed with orthogonal polarization. The transmitter 10-M outputs signal light of an optical frequency fM modulated and multiplexed with orthogonal polarization. The individual pieces of signal light of the optical frequencies are wavelength-multiplexed by a wavelength multiplexer 51 and output to the optical fiber transmission line 50.

The wavelength-multiplexed signal light received via the optical fiber transmission line 50 is demultiplexed by a wavelength demultiplexer 52 and input to the receivers 20-1 to 20-M. The receiver 20-1 processes signal light of the optical frequency f1. The receiver 20-M processes signal light of the optical frequency fM.

The structures of the transmitter 10 and the receiver 20 are not limited to those of the first embodiment illustrated in FIG. 1 and may be the structures in other embodiments.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

REFERENCE SIGNS LIST

1: AD converter
2: dispersion compensation circuit
3: phase rotation compensation circuit
4: waveform equalization circuit
5: phase estimation circuit
6: identification circuit
10: transmitter
11: signal light source
12: polarization multiplexing vector modulator
13: wavelength multiplexer
14: phase lock circuit
20: receiver
21: optical coupler
22: coherent receiver
23: phase lock circuit
24: local oscillator light source
25: digital signal processor
26: frequency difference measurement device
31, 41: oscillator
32, 42: mode-lock light source
33, 43: wavelength demultiplexer
50: optical fiber transmission line
51: wavelength multiplexer
52: wavelength demultiplexer

The invention claimed is:

1. An optical transmission system including a transmitter, a receiver, and an optical fiber transmission line, the transmitter and the receiver being connected to each other via the optical fiber transmission line, signal light being transmitted through the optical fiber transmission line, wherein the transmitter is configured to generate signal light in which an optical carrier signal of an optical frequency f1 is modulated and multiplexed with orthogonal polarization using two data signal sequences and send out the signal light to the optical fiber transmission line, and the receiver is configured to have two coherent receivers that perform coherent detection of the signal light using two pieces of local oscillator of optical frequencies f11 and f12 close to the optical frequency f1 of the signal light, f11<f12 holding, the two pieces of local oscillator being controlled to have a predetermined optical frequency spacing $\Delta F$, and a digital signal processor that performs digital signal processing by inputting electric signals output from each of the coherent receivers and demodulates the two data signal sequences, in which the digital signal processor sets a virtual reference frequency f1' close to the optical frequency f1 of the signal light for the two pieces of local oscillator and a frequency difference $\Delta f1$ of one of the two pieces of local oscillator from the reference frequency f1', obtains a frequency difference $\Delta f2$ of the other of the two pieces of local oscillator by calculating $\Delta f1 - \Delta F$, and further includes a plurality of phase rotation compensation circuits that input the electric signals output from the two coherent receivers and compensates phase rotation caused in the electric signals by the frequency differences $\Delta f1$ and $\Delta f2$, a waveform equalization circuit that performs adaptive equalization on outputs from the plurality of phase rotation compensation circuits, and a phase estimation circuit that compensates a residual component of phase rotation caused by a frequency difference between the optical frequency f1 of the signal light and the virtual reference frequency f1' in an output from the waveform equalization circuit.

2. The optical transmission system according to claim 1, wherein the receiver has a frequency difference measurement device that measures an optical frequency spacing between the two pieces of local oscillator as $\Delta F'$ instead of controlling the optical frequency spacing to $\Delta F$, and the digital signal processor sets the frequency difference $\Delta f1$ of the one of the two pieces of local oscillator from the reference frequency f1' and obtains the frequency difference $\Delta f2$ of the other of the two pieces of local oscillator by calculating $\Delta f1 - \Delta F'$ based on the measured optical frequency spacing $\Delta F'$.

3. An optical transmission system including a transmitter, a receiver, and an optical fiber transmission line, the transmitter and the receiver being connected to each other via the optical fiber transmission line, signal light being transmitted through the optical fiber transmission line, wherein
the transmitter is configured to generate signal light in which an optical carrier signal of an optical frequency f1 is modulated and multiplexed with orthogonal polarization using two data signal sequences and send out the signal light to the optical fiber transmission line, and
the receiver is configured to have p coherent receivers that perform coherent detection of the signal light using first to pth pieces of local oscillator of optical frequencies f11, f12, . . . , f1p close to the optical frequency f1 of the signal light, f11<f12< . . . <f1p holding, p being an integer equal to or more than 3, the first to pth pieces of local oscillator being controlled to have predetermined optical frequency spacings $\Delta F$ to $\Delta F(p-1)$, and a digital signal processor that performs digital signal processing by inputting electric signals output from each of the coherent receivers, and demodulates the two data signal sequences, in which
the digital signal processor
sets a virtual reference frequency f1' close to the optical frequency f1 of the signal light for the first to pth pieces of local oscillator and a frequency difference $\Delta f1$ of the first piece of local oscillator from the reference frequency f1',
obtains a frequency difference $\Delta f2$ of the second piece of local oscillator by calculating $\Delta f1-\Delta F$ and a frequency difference $\Delta fp$ of the pth piece of local oscillator by calculating $\Delta f(p-1)-\Delta F(p-1)$, and further
includes a plurality of phase rotation compensation circuits that receive the electric signals output from each of the p coherent receivers and compensates phase rotation caused in the electric signals by the frequency differences $\Delta f1$ to $\Delta fp$,
a waveform equalization circuit that performs adaptive equalization on outputs from the plurality of phase rotation compensation circuits, and
a phase estimation circuit that compensates a residual component of phase rotation caused by a frequency difference between the optical frequency f1 of the signal light and the virtual reference frequency f1' in an output from the waveform equalization circuit.

4. The optical transmission system according to claim 3, wherein
the receiver has a frequency difference measurement device that measures optical frequency spacings of the first to pth pieces of local oscillator as $\Delta F1'$ to $\Delta F(p-1)'$ instead of controlling the optical frequency spacings to $\Delta F$ to $\Delta F(p-1)$, and
the digital signal processor sets the frequency difference $\Delta f1$ of the first piece of local oscillator from the reference frequency f1 and obtains the frequency differences $\Delta f2$ to $\Delta fp$ of the other pieces of local oscillator by calculating $\Delta f1-\Delta F1'$ to $\Delta f(p-1)-\Delta F(p-1)'$ based on the measured optical frequency spacings $\Delta F1'$ to $\Delta F(p-1)'$.

5. An optical transmission system including a transmitter, a receiver, and an optical fiber transmission line, the transmitter and the receiver being connected to each other via the optical fiber transmission line, signal light being transmitted through the optical fiber transmission line, wherein
the transmitter is configured to generate first signal light and second signal light in which optical carrier signals of an optical frequency f1 and an optical frequency f2 are modulated and multiplexed with orthogonal polarization using two data signal sequences, wavelength-multiplex the first signal light and the second signal light, and send out the first signal light and the second signal light to the optical fiber transmission line, and
the receiver is configured to have two coherent receivers that perform coherent detection of the wavelength-multiplexed and transmitted first signal light and second signal light using two pieces of local oscillator of optical frequencies f11 and f12 close to the optical frequencies f1 and f2 of the first signal light and the second signal light, f11<f12 holding, the two pieces of local oscillator being controlled to have a predetermined optical frequency spacing $\Delta F$, and a digital signal processor that performs digital signal processing by inputting electric signals output from each of the coherent receivers and demodulates the two data signal sequences transmitted by the first signal light and the two data signal sequences transmitted by the second signal light, in which
the digital signal processor
sets the optical frequencies f1 and f2 of the first signal light and the second signal light and virtual reference frequencies f1' and f2' close to the optical frequencies f1 and f2 for the two pieces of local oscillator and frequency differences $\Delta f11$ and $\Delta f12$ of one of the two pieces of local oscillator from the reference frequencies f1' and f2',
obtains frequency differences $\Delta f21$ and $\Delta f22$ of the other of the two pieces of local oscillator by calculating $\Delta f11-\Delta F$ and $\Delta f12-\Delta F$, and further
includes a plurality of first phase rotation compensation circuits that input the electric signals output from the two coherent receivers, compensate phase rotation caused in the electric signals by the frequency differences $\Delta f11$ and $\Delta f21$, and separate and output a signal component transmitted by the first signal light,
a first waveform equalization circuit that performs adaptive equalization on outputs from the plurality of first phase rotation compensation circuits,
a first phase estimation circuit that compensates a residual component of phase rotation caused by a frequency difference between the optical frequency f1 of the first signal light and the virtual reference frequency f1' in an output from the first waveform equalization circuit,
a plurality of second phase rotation compensation circuits that input the electric signals output from the two coherent receivers, compensate phase rotation caused in the electric signals by the frequency differences $\Delta f12$ and $\Delta f22$, and separate and output a signal component transmitted by the second signal light,
a second waveform equalization circuit that performs adaptive equalization on outputs from the plurality of second phase rotation compensation circuits, and
a second phase estimation circuit that compensates a residual component of phase rotation caused by a frequency difference between the optical frequency f2 of the signal light and the virtual reference frequency f2' in an output from the second waveform equalization circuit.

6. The optical transmission system according to claim 5, wherein the receiver has a frequency difference measurement device that measures an optical frequency spacing between the two pieces of local oscillator as $\Delta F'$ instead of controlling the optical frequency spacing to $\Delta F$, and the digital signal processor sets the frequency differences $\Delta f11$ and $\Delta f12$ of the one of the two pieces of local oscillator from the reference frequencies f1' and f2' and obtains the frequency differences $\Delta f21$ and $\Delta f22$ of the other of the two pieces of local oscillator by calculating $\Delta f11-\Delta F'$ and $\Delta f12-\Delta F'$ based on the measured optical frequency spacing $\Delta F'$.

7. An optical transmission system including a transmitter, a receiver, and an optical fiber transmission line, the transmitter and the receiver being connected to each other via the optical fiber transmission line, signal light being transmitted through the optical fiber transmission line, wherein when n is an integer equal to or more than 2, m is an integer equal to or more than 2, k is an integer from 1 to n, and i is an integer from 2 to m, the transmitter is configured to generate n pieces of signal light in which optical carrier signals of optical frequencies f1 to fn are modulated and multiplexed with orthogonal polarization using two data signal sequences, wavelength-multiplex the n pieces of signal light, and send out the n pieces of signal light to the optical fiber transmission line, and the receiver is configured to have m coherent receivers that perform coherent detection of the n pieces of signal light using m pieces of local oscillator of optical frequencies f11 to f1$m$ close to the optical frequencies f1 to fn of the n pieces of signal light, f11<f12< . . . <f1$m$ holding, the m pieces of local oscillator being controlled to have predetermined optical frequency spacings $\Delta F1$ to $\Delta F(m-1)$, and a digital signal processor that performs digital signal processing by inputting electric signals output from the m coherent receivers and demodulates the 2n data signal sequences, in which the digital signal processor sets a virtual reference frequency fk' close to an optical frequency fk of the n pieces of signal light for the m pieces of local oscillator and a frequency difference $\Delta fk$ of one of the m pieces of local oscillator from the reference frequency fk', obtains a frequency difference $\Delta fi$ of the others of the m pieces of local oscillator by calculating $\Delta f(i-1)-\Delta F(i-1)$, and further includes a plurality of phase rotation compensation circuits that input the electric signals output from the m coherent receivers and compensates phase rotation caused in the electric signals by the frequency difference $\Delta fk$, a waveform equalization circuit that performs adaptive equalization on outputs from the plurality of phase rotation compensation circuits, and a phase estimation circuit that compensates a residual component of phase rotation caused by a frequency difference between the optical frequency fk of the n pieces of signal light and the virtual reference frequency fk' in an output from the waveform equalization circuit.

8. The optical transmission system according to claim 7, wherein the receiver has a frequency difference measurement device that measures optical frequency spacings of the m pieces of local oscillator as $\Delta F1'$ to $\Delta F(m-1)'$ instead of controlling the optical frequency spacings to $\Delta F1$ to $\Delta F(m-1)$, and the digital signal processor sets the frequency difference $\Delta fk$ of the one of the m pieces of local oscillator from the reference frequency fk' and obtains the frequency difference $\Delta fi$ of the others of the m pieces of local oscillator by calculating $\Delta f(i-1)-\Delta F(i-1)$ based on the measured optical frequency spacings $\Delta F1'$ to $\Delta F(m-1)'$.

* * * * *